(12) United States Patent
Yeo et al.

(10) Patent No.: US 12,312,805 B2
(45) Date of Patent: *May 27, 2025

(54) MULTIFUNCTIONAL LIGHTING ASSEMBLY FOR A T-BAR GRID ARRANGEMENT

(71) Applicant: Fusion Optix, Inc., Woburn, MA (US)

(72) Inventors: Terence Yeo, Concord, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,074

(22) Filed: Jan. 29, 2024

(65) Prior Publication Data

US 2024/0167275 A1  May 23, 2024

Related U.S. Application Data

(63) Continuation of application No. 17/882,485, filed on Aug. 5, 2022, now Pat. No. 11,885,128, which is a
(Continued)

(51) Int. Cl.
| | |
|---|---|
| *E04B 9/00* | (2006.01) |
| *E04B 9/06* | (2006.01) |
| *E04B 9/12* | (2006.01) |
| *E04B 9/18* | (2006.01) |
| *E04B 9/24* | (2006.01) |
| *F21S 8/00* | (2006.01) |
| *F21V 8/00* | (2006.01) |
| *F21Y 103/10* | (2016.01) |
| *F21Y 115/10* | (2016.01) |

(52) U.S. Cl.
CPC ............. *E04B 9/006* (2013.01); *E04B 9/067* (2013.01); *E04B 9/068* (2013.01); *E04B 9/18* (2013.01); *E04B 9/242* (2013.01); *E04B 9/247* (2013.01); *F21S 8/036* (2013.01); *G02B 6/0041* (2013.01); *E04B 9/127* (2013.01); *F21Y 2103/10* (2016.08); *F21Y 2115/10* (2016.08)

(58) Field of Classification Search
CPC . E04B 9/006; E04B 9/067; E04B 9/18; E04B 9/242; E04B 9/247; E04B 9/068; E04B 9/127; E04B 9/241; F21S 8/036; G02B 6/0041; F21Y 2103/10; F21Y 2115/10
See application file for complete search history.

(56) References Cited

U.S. PATENT DOCUMENTS

| | | | | |
|---|---|---|---|---|
| 2,752,017 A | * | 6/1956 | Segil ........................ | E04B 9/241 |
| | | | | 362/148 |
| 3,589,086 A | * | 6/1971 | Schilling ................. | E04B 9/247 |
| | | | | 52/778 |

(Continued)

*Primary Examiner* — Rodney Mintz

(57) ABSTRACT

A multifunctional lighting assembly is configured with optical components such as lenses and reflectors mounted within an elongate body that serves as a cross tee within a T-bar grid arrangement. Protrusions of the elongate body are used to position optical components and embodiments provide for the slidable mounting of optical components. Further embodiments provide for the support of ceiling panels within a suspended ceiling system, connection to a structural ceiling, and inclusion of further components such as sensors, electronic controllers, and wireless modules.

24 Claims, 23 Drawing Sheets

Related U.S. Application Data continuation of application No. 17/217,796, filed on Mar. 30, 2021, now Pat. No. 11,512,466.

(56) References Cited

U.S. PATENT DOCUMENTS

| | | | | |
|---|---|---|---|---|
| 4,043,689 A * | 8/1977 | Spencer | E04B 9/006 | 52/39 |
| 4,122,762 A * | 10/1978 | Williams | E04B 9/12 | 52/39 |
| 4,594,832 A * | 6/1986 | Akins | E04B 9/122 | 52/715 |
| 4,747,246 A * | 5/1988 | Sanborn | E04B 9/068 | 52/506.07 |
| 4,864,791 A * | 9/1989 | Platt | E04B 9/08 | 52/506.07 |
| 4,916,877 A * | 4/1990 | Platt | E04B 9/068 | 52/506.07 |
| 6,047,517 A * | 4/2000 | Vrame | E04B 9/006 | 52/669 |
| 6,345,800 B1 * | 2/2002 | Herst | E04B 9/006 | 248/342 |
| 7,634,881 B2 * | 12/2009 | Ahren | E04B 9/241 | 52/762 |
| 8,955,272 B1 * | 2/2015 | Underkofler | E04B 9/242 | 52/220.6 |
| 8,955,273 B1 * | 2/2015 | Lehane, Jr. | E04B 9/122 | 52/506.07 |
| 8,991,120 B2 * | 3/2015 | Lehane, Jr. | E04B 9/122 | 52/506.07 |
| 9,883,267 B2 * | 1/2018 | Porciatti | E04B 9/241 | |
| 9,976,727 B2 * | 5/2018 | White | F21S 4/20 | |
| 10,006,613 B2 * | 6/2018 | Oudina | F21V 21/048 | |
| 10,222,049 B2 * | 3/2019 | Porciatti | F21V 29/763 | |
| 10,313,771 B2 * | 6/2019 | Porciatti | E04B 9/006 | |
| 10,508,805 B2 * | 12/2019 | Porciatti | F21V 33/006 | |
| 10,527,261 B2 * | 1/2020 | White | E04B 9/006 | |
| 10,541,522 B2 * | 1/2020 | Lalancette | H02G 3/381 | |
| 10,788,176 B2 * | 9/2020 | Medendorp, Jr. | F21V 21/02 | |
| 10,808,896 B2 * | 10/2020 | Casement | F21S 8/063 | |
| 10,947,725 B2 * | 3/2021 | Lin | E04B 9/006 | |
| 11,175,023 B2 * | 11/2021 | Jones | F21S 8/026 | |
| 11,339,570 B2 * | 5/2022 | Lin | E04B 9/18 | |
| 11,506,349 B2 * | 11/2022 | Porciatti | E04B 9/18 | |
| 11,512,466 B2 * | 11/2022 | Yeo | E04B 9/067 | |
| 11,885,128 B2 * | 1/2024 | Yeo | E04B 9/242 | |
| 2007/0107353 A1 * | 5/2007 | Ahren | E04B 9/241 | 52/506.1 |
| 2010/0043330 A1 * | 2/2010 | Svensson | E04B 9/14 | 52/506.08 |
| 2014/0226316 A1 * | 8/2014 | Medendorp, Jr. | F21V 21/02 | 362/147 |
| 2015/0033657 A1 * | 2/2015 | Underkofler | E04B 9/242 | 52/506.07 |
| 2015/0040494 A1 * | 2/2015 | Lehane, Jr. | E04B 9/122 | 52/506.07 |
| 2015/0040495 A1 * | 2/2015 | Lehane, Jr. | E04B 9/18 | 52/506.07 |
| 2016/0061395 A1 * | 3/2016 | White | E04B 9/122 | 362/147 |
| 2017/0082252 A1 * | 3/2017 | Casement | G02B 6/0051 | |
| 2017/0272849 A1 * | 9/2017 | Porciatti | E04B 9/064 | |
| 2017/0307188 A1 * | 10/2017 | Oudina | E04B 9/006 | |
| 2018/0128475 A1 * | 5/2018 | Porciatti | F21S 4/28 | |
| 2018/0132021 A1 * | 5/2018 | Porciatti | E04B 9/241 | |
| 2018/0138679 A1 * | 5/2018 | Lalancette | F16M 13/027 | |
| 2018/0259173 A1 * | 9/2018 | Porciatti | F21V 33/006 | |
| 2019/0003691 A1 * | 1/2019 | White | E04B 9/122 | |
| 2019/0195475 A1 * | 6/2019 | Jones | F21V 21/041 | |
| 2019/0289376 A1 * | 9/2019 | Porciatti | E04B 9/006 | |
| 2020/0149275 A1 * | 5/2020 | Lin | E04B 9/006 | |
| 2020/0217071 A1 * | 7/2020 | Yeo | G02B 5/0205 | |
| 2020/0385987 A1 * | 12/2020 | Yeo | E04B 9/006 | |
| 2021/0032865 A1 * | 2/2021 | Lin | E04B 9/12 | |
| 2021/0301991 A1 * | 9/2021 | Yeo | F21V 23/0442 | |
| 2021/0348730 A1 * | 11/2021 | Porciatti | F21S 4/28 | |
| 2022/0316207 A1 * | 10/2022 | Yeo | E04B 9/242 | |
| 2022/0372752 A1 * | 11/2022 | Yeo | E04B 9/067 | |

\* cited by examiner

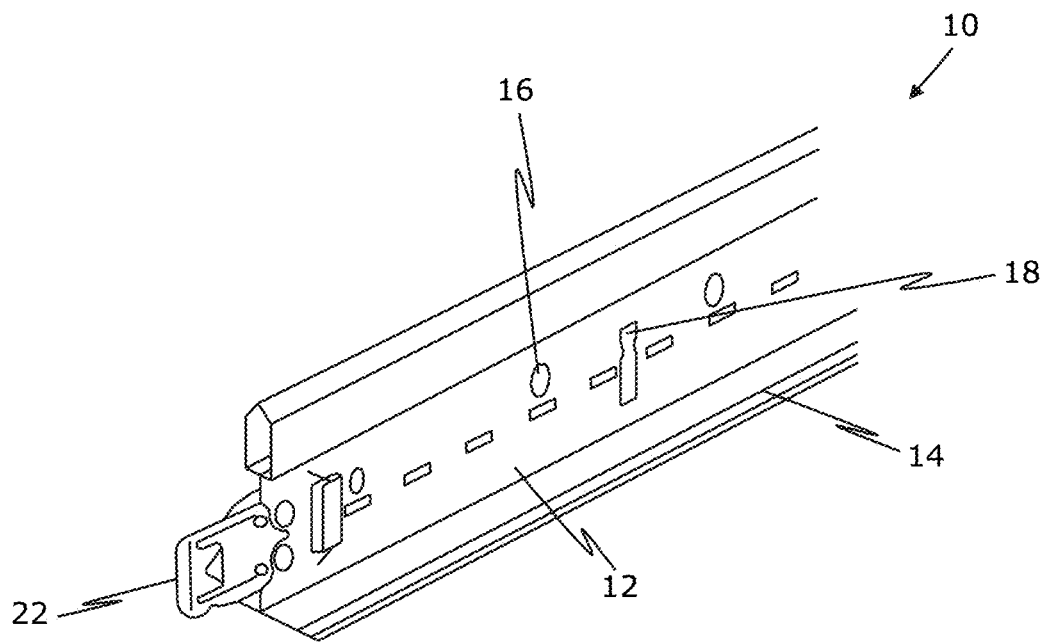
FIG. 1A [Prior Art]
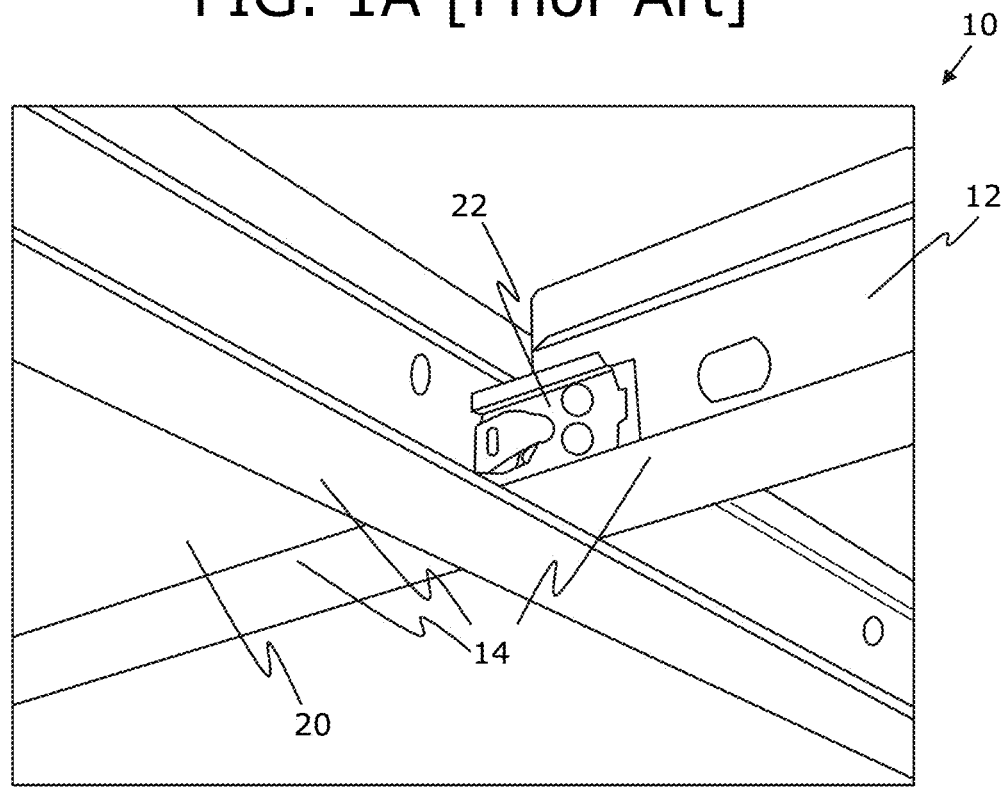
FIG. 1B [Prior Art]

MULTIFUNCTIONAL LIGHTING ASSEMBLY FOR A T-BAR GRID ARRANGEMENT

TECHNICAL FIELD

The present disclosure relates to a support assembly for use in a suspended ceiling system. More particularly, the present disclosure relates to a multifunctional ceiling support assembly for use in a suspended ceiling system which typically supports ceiling tiles and lighting apparatuses.

BACKGROUND

Contemporary buildings, for example, houses or offices often employ a structural ceiling from which is supported a suspended ceiling arrangement. Typically, the suspended ceiling arrangement includes a plurality of ceiling tiles or panels hanging at a distance below the structural ceiling that may vary between only a few inches or several feet depending upon one or more constraints that are typically encountered in the space below the structural ceiling such as presence of HVAC ducting, electrical conduits, or a desired amount of height that should be made available for use in a room below the suspended ceiling arrangement.

In traditional configurations, the suspended ceiling arrangement further includes a plurality of T-bars that are configured to support the plurality of ceiling tiles or panels in position; the plurality of T-bars is suspended from the structural ceiling, for example via an arrangement of wires or rods. Specifically, such an arrangement of the plurality of T-bars provides cells to accommodate the plurality of ceiling tiles or panels therein. Additionally, a flush-finish of lower surfaces of the plurality of T-bars, and the plurality of ceiling tiles or panels are such that they appear as a continuous mono-planar lower ceiling surface. Typical common ceiling tiles sizes arranged in grid arrays include 12"×12", 12"×24", 24"×48", 24"×60", 24"×72", 30"×30", 20"×60", 30"×60", 60"×60", and 48"×48". Ceiling tiles for a "Lay-In" configuration typically have squared 90 degree edges while ceiling tiles for "Tegular" configurations are typically kerfed on the edges to allow the tiles to protrude slightly below the T-bars or a ceiling plane. Common standard widths of T-bar horizontal portions are 9/16", 15/16" and 1.5". These widths correspond with the apparent spacing between ceiling tiles as seen within a room.

Lighting devices or apparatuses are utilized in many diverse applications, such as in office workspaces, in hospitals, in warehouses, in educational institutions, in cleanrooms, in data centers, in research laboratories, in indoor and outdoor living spaces, in industrial areas, in vehicles and so forth to provide illumination for humans performing visual tasks. Contemporarily, lighting devices are also employed for aesthetic purposes to provide a visually comforting environment to a given person. In traditional configurations of installing these lighting devices, these lighting devices are known to have been affixed to ceilings, walls and other building elements to illuminate their environs.

In contrast to these highly traditional methods of installing the aforementioned lighting devices, some other traditionally configured suspended ceiling arrangements are also known to have been additionally provided with lighting fixtures that are designed to replace 2×2 or 2×4 ceiling tiles in an arrangement that allows for operatively illuminating the surroundings, for example, a cubical space in an office, a corridor of a house, and the like. These light fixtures may also be designed to include as two or three fluorescent tubes as panels with light emitting diodes, for example, in the form of troffers that may require support on all four sides for accomplishing an installation of such light fixtures. Moreover, these lighting fixtures are arranged within the suspended ceiling arrangements to be supported at specific points, or in specific areas, of the suspended ceiling with an intention to achieve an aesthetically pleasant look. However, despite such intentions, the traditional configurations of such suspended ceiling arrangements are incapable of satisfying such desirable luminaires to meet aforementioned expectations.

Major issues that are encountered with the implementation of the traditionally configured suspended ceiling arrangements are that the traditionally configured suspended ceiling arrangements, during installation, are complex to retrofit in addition to being costly to replace during the retro-fitment process. Moreover, in use as a consequence to the implementation of these traditionally configured suspended ceiling arrangements itself, these traditionally configured suspended ceiling arrangements continue to offer a monotonous look and therefore, render the overall suspended ceiling with substantially unappealing aesthetics. On many occasions, an environment or workspace may also be additionally provided with multiple smaller lighting devices such as downlights that help provide an increased, focused, or in other words, specifically-directed light for allowing persons in the room to perform minutely detailed tasks. In many cases, these small lighting devices may include multiple light sources, for example, bulbs and the like. However, such use of multiple small light sources consequentially results in an increase in installation and maintenance costs besides leading to inefficient energy usage, wastage of resources and environmental pollution.

A further issue that is encountered with use of conventionally or traditionally designed suspended ceiling arrangements is that replacing the conventionally designed suspended ceiling arrangements, for example when refurbishing a given building, in which another conventionally or traditionally suspended ceiling arrangement previously exists, generates a lot of waste material that is potentially not straightforward to recycle or reuse. Moreover, such generation of waste material can be environmentally detrimental to achieving an energy efficient planet preferably with a minimal carbon-footprint.

Even further, a number of support elements, for example, the T-bars used together with the ceiling panels for forming the conventional suspended ceiling arrangements lack adequate provisions for enhancing the functionalities besides merely supporting the ceiling panels.

Therefore, taking aforementioned problems into consideration, there exists a need to overcome the aforementioned drawbacks associated with the existing T-bars and lighting devices used in conjunction with a suspended ceiling grid arrangement.

SUMMARY

The present disclosure seeks to provide a multifunctional ceiling support assembly for use in forming a suspended ceiling grid arrangement. The multifunctional ceiling support assembly is configured to be easier to manufacture, install and reconfigure after initial installation (for example to achieve one or more additional, or modified, functionalities). Further, the multifunctional ceiling support assembly is inexpensive to manufacture, i.e. owing to the simplified manufacturing and design process, easier to recycle or reuse when a building incorporating the suspended ceiling system is being dismantled or refurbished. Further, the present disclosure seeks to provide the multifunctional ceiling support assembly that is versatile in its use for providing an improved ease of control in the installation and use of light fixtures while also accommodating one or more concomitant power cable connections for rendering power supply to these light fixtures. Furthermore, the present disclosure seeks to provide the multifunctional ceiling support assembly for use as a modular functional fixture that is capable of accommodating various other types of user-operable objects such as optical elements, power modules, speakers, and the like. Furthermore, the present disclosure seeks to provide a robust and flexible multifunctional ceiling support assembly that can be configured easily and quickly by a user during an installation process whilst suiting various requirements that may be encountered during the installation process. Principally, the multifunctional ceiling support assembly of the present disclosure can function as a new T-bar (i.e. can replace conventional T-bar), can be used in conjunction with existing T-bar of the suspended ceiling grid arrangement, act as lighting device or apparatus, and enables in supporting ceiling tiles thereon. Also, the multifunctional ceiling support assembly provides versatility in terms of overall construction of the suspended ceiling grid arrangement, essentially in terms of lighting arrangement and supporting ceiling tiles.

In one aspect, the present disclosure provides a multifunctional ceiling support assembly for use in a suspended ceiling system having a T-bar grid arrangement supporting ceiling tiles. The multifunctional ceiling support assembly comprises an elongate body comprising an elongate planar base portion having first and second lateral ends, first and second longitudinal ends, and a top plane; first and second connecting members each positioned at the first and second longitudinal ends of the elongate body and configured with support portions capable of attachment to the T-bar grid arrangement; and a third connecting member mounted on the top plane of the elongate body, the third connecting extends up from the elongate body and functions to separate and position ceiling tiles within the T-bar grid arrangement.

Optionally, each of the first and second connecting members comprises a first support portion, a second support portion integral with the first support portion, and a third support portion integral with the second support portion. The first support portions of the first and second connecting members are adapted to be coupled to the top plane of the base portion at the first and second longitudinal ends, respectively, using fasteners. The second support portions of the first and second connecting members are configured to rest on horizontal legs of two laterally spaced apart T-bars. The third support portions are configured to be coupled with vertical legs of the two laterally spaced apart T-bars.

More optionally, each of the first and second connecting members further comprises a projecting tab integral with the third support portion, and wherein the projecting tab of each of the first and second connecting members is configured to be received by one vertical slot of a vertical leg of the two laterally spaced apart T-bars.

Optionally, the third connecting member comprises a first support portion coupled to the top plane of the base portion, and a second support portion extending vertically from the first support portion, the second support portion comprising a cut-out for receiving an anchor of a T-bar arranged between the two laterally spaced apart T-bars.

Optionally, the elongate body further comprises a first clip and a second clip extending generally upwardly from the top plane at the first and second lateral ends, respectively, of the base portion, wherein the first clip, the second clip and the top plane of the base portion define a first channel therebetween, and a first protrusion and a second protrusion extending generally downwardly from the bottom plane at the first and second lateral ends, respectively, of the base portion, wherein the first protrusion, the second protrusion and the bottom plane of the elongate planar base portion define a second channel therebetween.

Optionally, each of the first, second and third connecting members further comprises an anchoring hole that serves as an attachment point for suspension from a structural ceiling.

Optionally, the multifunctional support assembly is operable to connect two T-bars within the suspended ceiling system.

Optionally, the elongate body houses a light source.

More optionally, the light source comprises a light emitting diode.

Optionally, a width of the elongate body is less than or equal to the width a T-bar within the T-bar grid arrangement.

More optionally, the elongate body is at least partially recessed within tegular edges of two abutting ceiling tiles.

More optionally, a light source is recessed within the tegular edges of two abutting ceiling tiles.

Optionally, a ceiling tile rest upon the top plane of the elongate body.

Optionally, a width of the elongate body is greater than the width of a T-bar within the T-bar grid arrangement.

Optionally, the elongate body is oriented at an angle not parallel or perpendicular to the T-bar grid arrangement.

Optionally, the elongate body houses a reflector.

Optionally, the multifunctional support assembly further comprises a light guide having an input edge within the elongate body.

Optionally, the multifunctional ceiling support assembly further comprises a light source and an upward projecting lens suspended below the elongate body.

Optionally, the multifunctional ceiling support assembly further comprises a component selected from a group consisting of an alarm, sensors, ventilation fan, heater, humidifier, electronic controller, power supply, battery, wireless communication module, light guide, reflector.

Optionally, the multifunctional support assembly of claim 1, further comprising mechanical features, electrical connectors, etc.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 1A (Prior Art) is a perspective top view of a T-bar of conventional design, in accordance with an embodiment of the present disclosure;

FIG. 1B (Prior Art) is a perspective bottom view of a conventional T-bar ceiling grid system, in accordance with an embodiment of the present disclosure;

Figure 2:
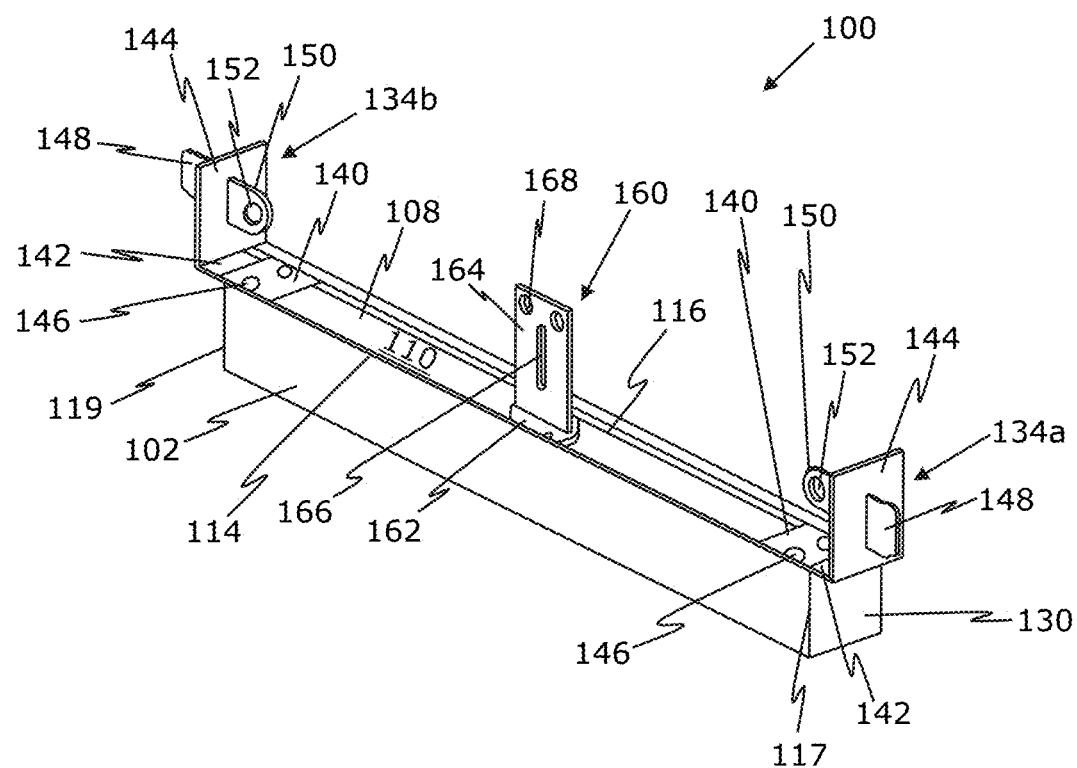
FIG. 2 is a perspective top view of a multifunctional ceiling support assembly, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with a multifunctional ceiling support assembly that functions within a suspended ceiling system to support and align one or more ceiling tiles, connect one or more T-bars or other structural grid elements, and provide a means of connecting suspension cables or other suspension hardware.

Modular ceiling systems are employable to implement suspended ceilings, also referred to herein as "suspended ceiling grid arrangements". Herein, the term "suspended ceiling grid arrangements" refers to a ceiling including a ceiling grid suspended or hung at a height below a structural ceiling of a given architecture, such as a room of a house, or a building. It will be appreciated that the structural ceiling is an overhead interior surface that covers, and defines, a maximum upper spatial limit of a room. In an example, the structural ceiling may be at a height of 2.5 meters from a floor (not shown) of the room. In such an example, the height below the structural ceiling for holding the suspended ceiling grid arrangement is 0.25 (approximately) metres (meters) from the height of the structural ceiling, i.e. 2.25 (approximately) metres (meters) from a floor of the room. Furthermore, the suspended ceiling grid arrangement is suspended or hung at the height using wires that hang from, and are securely fixed to, the structural ceiling. Optionally, the hanging wires can be hinged, hooked, tied, coupled, plastered securely or affixed to the structural ceiling. In an instance, during installation, the hanging wires are coupled to the structural ceiling to support the suspended ceiling grid arrangement to be hung at the desired height therefrom. Furthermore, the suspended ceiling grid arrangement is supported by the hanging wires at the desired height to provide a gap between the structural ceiling and the suspended ceiling grid arrangement. Beneficially, the gap provides a space for other electrically and/or electronically operated devices to be arranged therebetween.

Typically, the suspended ceiling grid arrangement includes a grid formation constructed using metallic bars (T-bars). The term "T-bars" used herein relates to hardware components such as an elongate rigid spine extending between mutually opposing walls that form terminal ends of the ceiling. Additionally, the T-bars include an inverted T-shaped structure comprising a flat vertical leg (supporting portion) integral to a flat horizontal leg (base portion). Furthermore, the T-bars include either a fixed anchor or an adjustable anchor for attachment to an adjacent member, such as another T-bar(s) or other holding arrangement(s) for securely holding or suspending the T-bar. The T-bars are of various styles, types and sizes and are generally characterized by the grid type. The term "grid type" refers to a property of the T-bar indicating the type, style or size of the T-bar being implemented. Generally, the grid type of the T-bar is a 15/16" flat style. However, other different grid types or other styles may also be implemented without limiting the scope of the disclosure. For instance, other grid type includes, but is not limited to, a slimline grid type or 9/16" flats including a 9/16" slot, a concealed grid type or a semi-concealed grid type. Moreover, larger T-Bars including 1.5" and 2" grid type are employed in industrial applications such as clean rooms, data centers, food processing plants and so forth. Optionally, the T-bars are conjoined to the hanging wires, either by hooking, welding, gluing, and so forth. Moreover, the T-bars include tracks or holes to which the hanging wires can be coupled to and/or can be latched onto for supporting (i.e. holding or suspending) the suspended ceiling grid arrangement from the structural ceiling. Furthermore, the T-bars of the suspended ceiling grid arrangement form an array of cells into which ceiling panels can be arranged. Moreover, the array of cells is formed by the grid of horizontal legs of the T-bars. Optionally, the T-bars also include axes (imaginary line) passing through joining of the vertical legs and the horizontal legs. Furthermore, the axes cross each other when two T-bars overlap or cross each other either perpendicularly or at an angle.

Furthermore, the term "ceiling panels" as used herein relates to a lightweight structure, usually a shallow "cuboidal" structure, having a length, a breadth, and a height which are placed within an opening formed by the T-bars for providing a planar lower surface of the suspended ceiling. Optionally, the ceiling panels are fabricated from a porous cellular structure, having gaseous voids therein. Optionally, the ceiling panels are implemented as a plurality of substantially mutually identical panels, wherein each panel has major exterior surfaces that are substantially rectangular in form, for example square in form, when viewed from the given room. In some cases, the ceiling panels may have edges that are adapted to include one or more edgewise protruding lips and/or define one or more edgewise grooves i.e., along a length of the edge for enabling the ceiling panels to be securely held, or supported, during installation onto the grid.

Furthermore, the grid formation is configured to accommodate various electronic and/or electrical devices for providing a plurality of services in the room. Examples of various electronic and electrical devices may include at least one of: lights, alarms, sensors, ventilation fans, heaters, humidifiers, electronic controller, power supply, battery, wireless communication module, light guide, reflector and the like. For example, the suspended ceiling grid arrangement can include a power system for supplying electric power to the various electrically and/or electronically operated devices.

FIG. 1A is a perspective top view of a typical T-bar 10, of conventional design and FIG. 1B is a bottom view of the same type of typical T-bar shown in a suspended ceiling grid arrangement. The T-bar 10 includes a vertical leg 12 and a horizontal leg 14. In a suspended ceiling grid arrangement, the vertical leg 12 of each T-bar 10 has one or more holes 16 periodically passing therethrough through which a wire or any other suspension element may connect with and support the suspended ceiling array of T-bars at the desired elevation above the floor. Further, the T-bar 10 includes one or more slots 18 configured to accommodate an anchor 22 of the T-bar 10. Furthermore, the horizontal legs 14 of the T-bars 10 define the general ceiling plane for supporting the plurality of ceiling panels. The general ceiling plane is formed by the horizontal legs 14 of the T-bar 10. Herein, the axes of the horizontal legs 14 of the T-bars 10 are coplanar to the general ceiling plane. Additionally, the general ceiling plane is parallel to the floor of, for example, a room of a house, office, hallway, clean room etc. Optionally, the general ceiling plane is at a height 2.5 to 3 metres above the floor of the house. Typically, the vertical portion 12 of the T-bar 10 comprises the anchor 22 configured to be mechanically coupled with other mechanical components, the wall or ceiling to support a multifunctional ceiling support assembly. FIG. 1B shows a ceiling tile 20 installed in the suspended ceiling grid arrangement whereby the edges are resting upon horizontal legs 14 of T-bars.

Figure 3:
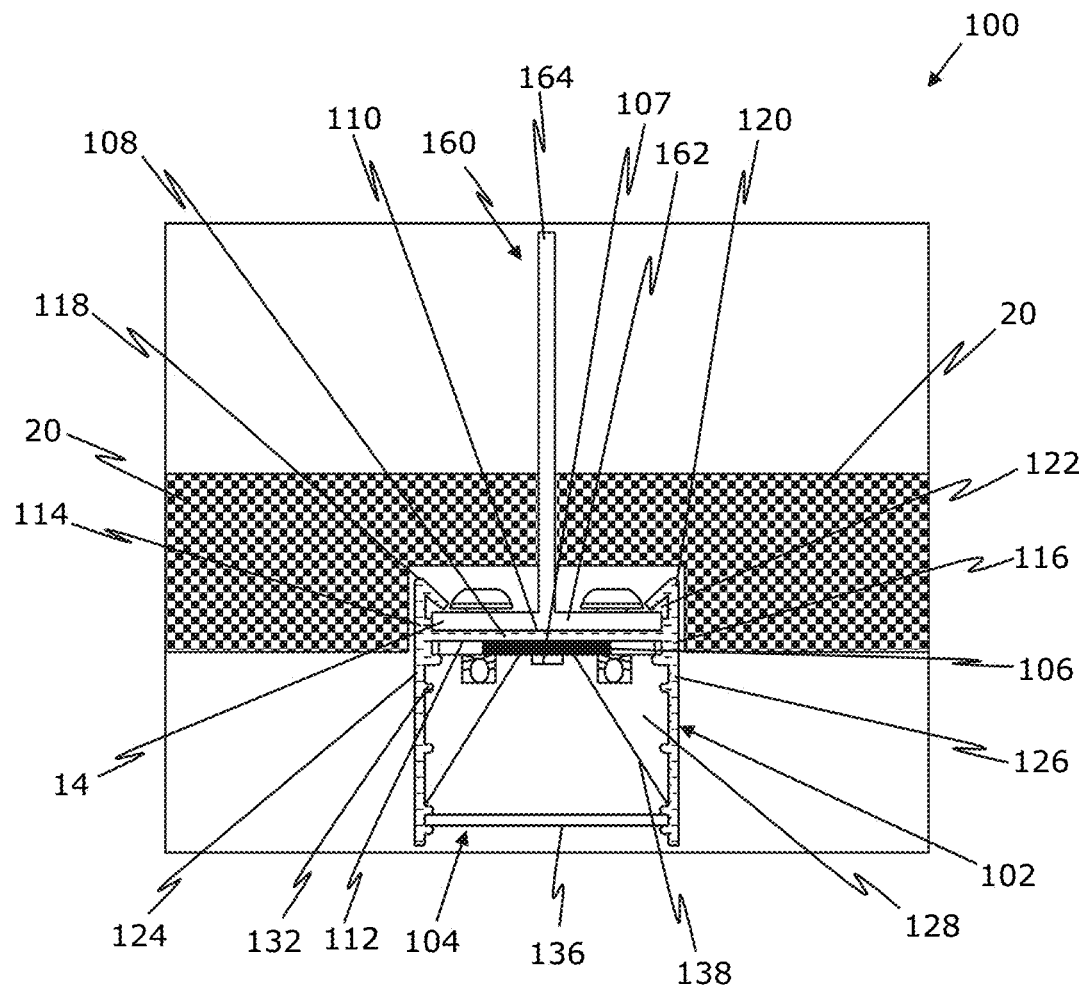
FIG. 3 is a transverse cross-section view of the multifunctional ceiling support assembly of FIG. 2 with ceiling tiles of tegular design being supported by the multifunctional ceiling support assembly, in accordance with an embodiment of the present disclosure.

FIG. 2 is a perspective top view of a multifunctional ceiling support assembly 100 that can be replaced by or used in conjunction with the T-bar 10 explained in conjunction with the FIGS. 1A-B. Further, FIG. 3 illustrates is a transverse cross-section view of the multifunctional ceiling support assembly of FIG. 2. The multifunctional ceiling support assembly 100 includes the elongate body 102. Typically, the elongate body 102 is oriented parallel to the T-bar grid arrangement, i.e. oriented parallel to the horizontal legs 14 of T-bars 10. In an embodiment, the the elongate body 102 may be oriented at an angle not parallel or perpendicular to the T-bar grid arrangement. In an example, longitudinal ends of the elongate body 102 may be distant from the T-bar grid arrangement in a non-uniform manner. Alternatively, the elongate body 102 may be configured to have a non-uniform height at the longitudinal ends thereof. The elongate body 102 is in this embodiment an extruded profile shape, typically comprised of metal, polymer, or composite material. Further, the elongate body 102 includes an elongate planar base portion 108 (hereinafter referred to as 'the base portion'). The base portion 108 is fabricated in a shape of a flat shaped member having a top plane 110 and a bottom plane 112. It will be seen that the top plane 110 and the bottom plane 112 form two opposing sides of the base portion 108.

The base portion 108 of the elongate body 102 has a first lateral end 114, a second lateral end 116, a first longitudinal end 117, and a second longitudinal end 119.

Furthermore, as illustrated in FIG. 3, the elongate body 102 includes a first clip 118 extending generally upwardly from the top plane 110 of the base portion 108. The first clip 118 is generally extending from the first lateral end 114 of the base portion 108. Moreover, the elongate body 102 includes a second clip 120 extending generally upwardly from the top plane 110 of the base portion 108. The second clip 120 is generally extending from the second lateral end 116 of the base portion 108. As shown, the first clip 118 and the second clip 120, along with the base portion 108, define a first channel 122 therebetween. The first channel 122 is in a form of a hollow space, above the base portion 108, adapted to receive, for instance, a first support portion 162 of a third connecting member 160. The first and second clips 118, 120 of the elongate body 102 are adapted to co-operatively secure the third connecting member 160 within the first channel 122. It will be appreciated that a width of the base portion 108 is beneficially defined as such to match the horizontal width of the T-bars within the suspended ceiling grid system. For example, in an embodiment, the width of the elongate body 102, particularly, the base portion 108, is less than or equal to the width a T-bar within the T-bar grid arrangement. In another embodiment, the width of the elongate body 102 is greater than the width of a T-bar within the T-bar grid arrangement.

Furthermore, as illustrated in FIG. 3, the elongate body 102 includes a first protrusion 124 extending generally downwardly from the bottom plane 112 of the base portion 108. The first protrusion 124 is generally extending from the first lateral end 114 of the base portion 108. Moreover, the elongate body 102 includes a second protrusion 126 extending generally downwardly from the bottom plane 112 of the elongate body 102. The second protrusion 126 is generally extending from the second lateral end 116 of the base portion 108. As will be seen, the first and second protrusions 124, 126 together with the base portion 108 define a second channel 128 (interchangeably referred to as void space) therebetween. The second channel 128 is in a form of a hollow space, below the base portion 108, adapted to receive the at least one elongate light assembly 104 in the multifunctional ceiling support assembly 100. As shown in FIG. 3, the elongate body 102 houses at least one elongate light assembly 104. Herein, the elongate light assembly 104 includes a printed circuit board (PCB) 106 and one or more light emitting diodes (LEDs) 107 (only one being shown in the illustration) arranged on the PCB 106. Typically, the LEDs 107 are arranged on the PCB 106 in a predefined pattern to provide a desired pattern of illumination. The elongate light assembly 104 is arranged and supported in the elongate body 102, in the ceiling support assembly 100. It will also be appreciated that although the elongate light assembly 104 has been shown and described to include the PCB 106 with the plurality of light emitting diodes 107 arranged thereon, the elongate light assembly 104 optionally has any other suitable configuration without departing from the scope and the spirit of the present disclosure. Further, the second channel 128 is beneficially defined to allow for accommodation of the PCB 106 of the elongate light assembly 104 in the multifunctional ceiling support assembly 100. In this manner, the elongate light assembly 104 is arranged in the second channel 128 of the elongate body 102. It will be appreciated from the illustration of FIG. 3 that the second channel 128 in the elongate body 102 provides a space to accommodate the elongate light assembly 104 assembly of the multifunctional ceiling support assembly 100.

As illustrated in FIG. 3, the elongate light assembly 104 includes at least one optical element 136 supported in the second channel 128. In the present examples, the optical element 136 is beneficially a lens that, for example, may rely on the principal of total internal reflection or include a rotationally symmetrical design for providing a uniform light distribution. Further, as illustrated in FIG. 3, each of the first and second protrusions 124, 126 comprise inwardly projecting lips 132 for slidably supporting the optical element 136 within the second channel 128. Moreover, as illustrated in FIG. 3, the elongate light assembly 104 includes at least one reflector 138 arranged in the second channel 128. The at least one reflector 138 is positioned around the one or more LEDs 107 (light emitting diodes) and located above the optical element 136.

By accommodating the elongated light assembly 104, comprising the PCB 106, the LEDs 107 and the optical element 136 in a compact manner between the first and second protrusions 124, 126, i.e., within the second channel 128 of the elongate body 102, an amount of complexity in the design of the multifunctional ceiling support assembly 100 is simplified to a minimum while an amount of time and effort that is incurred during installation of the ceiling support assembly 100 is also reduced. With continued reference to, and as shown in the view of, FIG. 3, the multifunctional ceiling support assembly 100 may further comprise a sensor arrangement to provide input for controlling operation of the elongate light assembly 104. The sensor arrangement may be configured to switch the elongate light assembly 104 based on at least a user requirement or a user activity. The term "user activity" refers to a movement or action detected by at least one of the sensors in the sensor arrangement, based on which the elongate light assembly 104 is configured to behave, or operate, corresponding to the user activity. In an implementation scenario, the sensor arrangement may optionally include an Internet-of-Things (IOT) device that is configured for switching the elongate light assembly 104 "ON" or "OFF". Moreover, the elongate light assembly 104 may be configured to detect a presence or movement of a user for switching the lighting arrangement "ON" or "OFF". In an example, user activity may include a hand clap, hand movement, finger pinch or flick and the like.

Further, any type of sensors may be implemented for use within the sensor arrangement. For example, the sensors forming part of the sensor arrangement may include one or more of an audio sensor, acoustic sensor, motion sensor, position sensor, proximity sensor, light sensor, ultrasonic sensor and accelerometer. In an example, the sensor arrangement may also be equipped with a sound recognition sensor (e.g. an ultrasound sensor) configured to control the elongate light assembly 104 via another device, such as an ultrasonic hand controller, a near-field wireless device or even ordinary acoustic signals such as human clapping of hands.

Referring now to FIGS. 2, 4-6 and 8, in embodiments herein, the multifunctional ceiling support assembly 100 also includes first and second end caps 130 that are arranged on respective first and second longitudinal ends 117, 119 of the elongated body 102.

As shown best in the view of FIG. 2, the ceiling support assembly comprises first and second connecting members 134a, 134b. Each of the first and second connecting members 134a, 134b includes a first support portion 140, a second support portion 142, and a third support portion 144.

The second support portion 142 is integral with the first support portion 140 and the third support portion 144 is integral with the second support portion 142. As shown, the second support portion 142 extends linearly from the first support portion 140 while also being oriented orthogonally to the third support portion 144.

Figure 6:
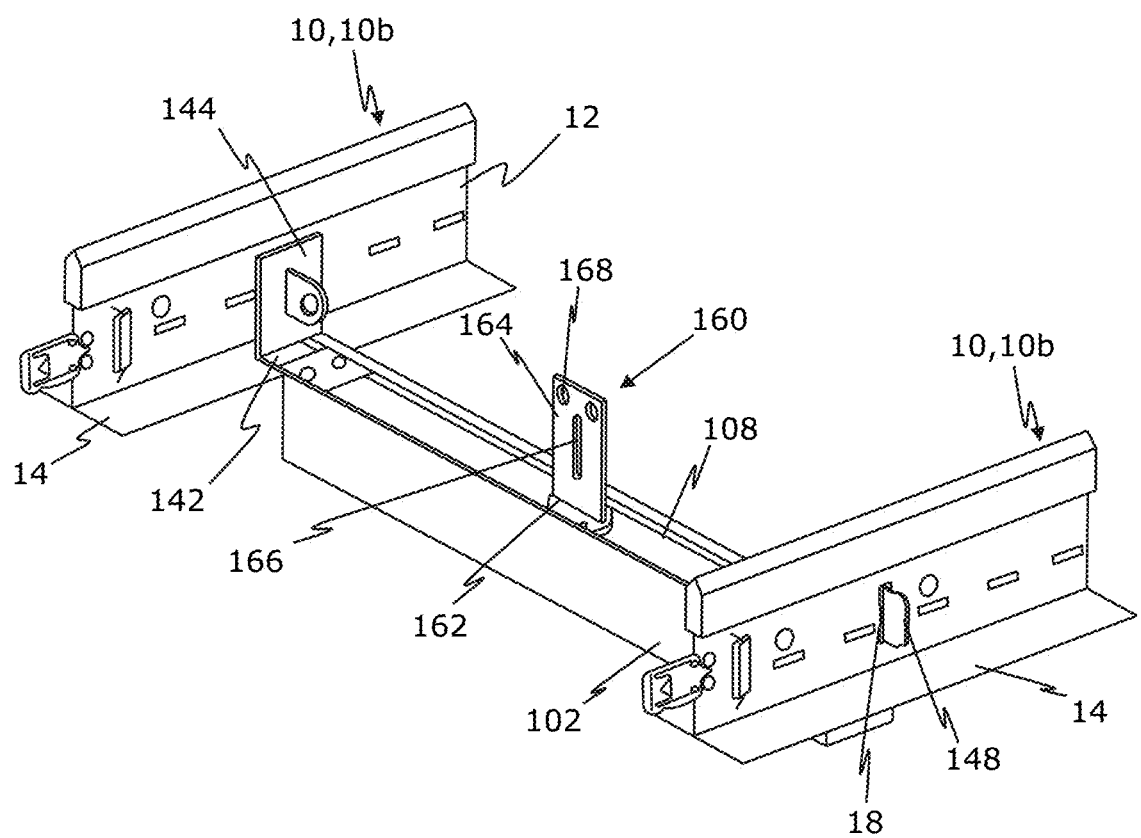
FIG. 6 is a perspective top view of the multifunctional ceiling support assembly of FIG. 2 coupled to a pair of T-bars offset along the longitudinal axis of the multifunctional ceiling support assembly, in accordance with yet another embodiment of the present disclosure.

The first support portions 140 of the first and second connecting members 134a, 134b are adapted to be coupled to the top plane 110 of the base portion 108 at the first and second longitudinal ends 117 and 119 respectively using fasteners 146. Further, the second support portions 142 of the first and second connecting members 134a, 134b are configured to rest on horizontal legs 14 of two laterally spaced apart T-bars 10b, as shown in the view of FIG. 6. The third support portions 144 enables in mounting the multifunctional ceiling support assembly 100 between two laterally spaced apart T-bars 10b.

Figure 4:
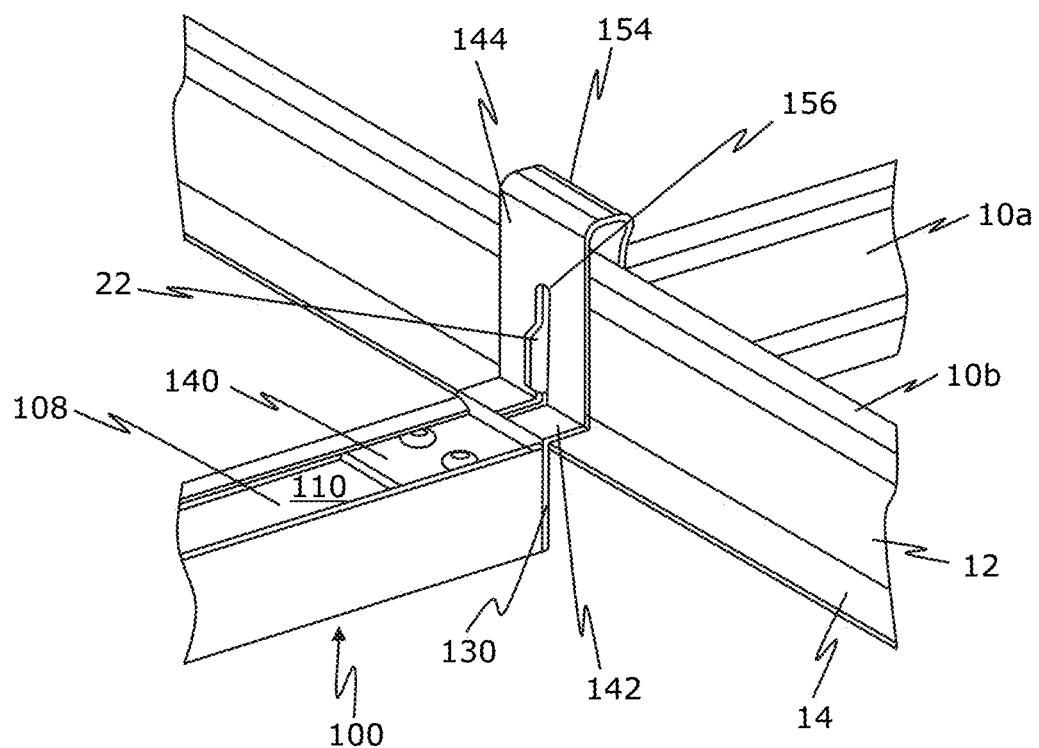
FIG. 4 is a perspective top view of a multifunctional ceiling support assembly, in accordance with another embodiment of the present disclosure.

Furthermore, the third support portions 144 are configured to be coupled with vertical legs 12 of the two laterally spaced apart T-bars 10b by use of connecting anchors 22, as shown in FIG. 4.

Moreover, as shown in the view of FIG. 2, each of the first and second connecting members 134a, 134b further comprises a projecting tab 148 integral with the third support portion 144. The projecting tab 148 of each of the first and second connecting members 134a, 134b is configured to be received by vertical slots 18 defined in the vertical legs 12 of the two laterally spaced apart T-bars 10b, as shown in FIG. 6.

Each of the first and second connecting members 134a, 134b also includes a support tab 150 integral with the third support portion 144. As shown in the view of FIG. 2, this support tab is configured to define a hole 152 for supporting a suspension cable therethrough. In other words, the first and second connecting members are configured with support portions, such as the projecting tab 148 and the support tab 150, capable of attachment to the T-bar grid arrangement.

Figure 5:
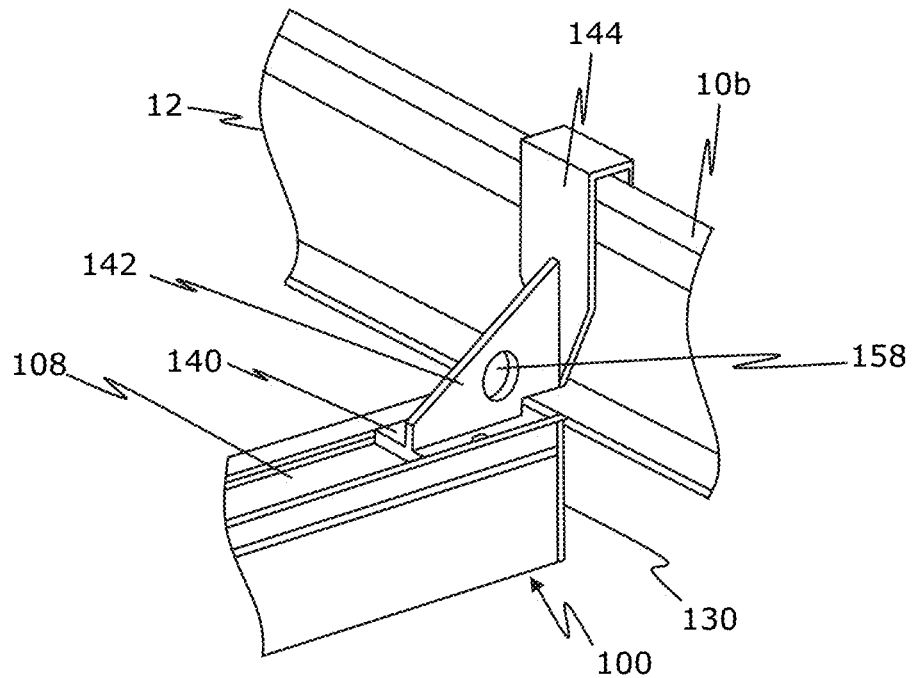
FIG. 5 is a perspective top view of a multifunctional ceiling support assembly, in accordance with yet another embodiment of the present disclosure.

Further, as shown in FIGS. 4 and 5, each of the third support portions 144 of the first and second connecting members 134a, 134b comprises a hook portion 154. The hook portion 154 of each of the first and second connecting members 134a, 134b is configured to be mounted on one of the vertical legs 12 of the two laterally spaced apart T-bars 10b.

Figure 8:
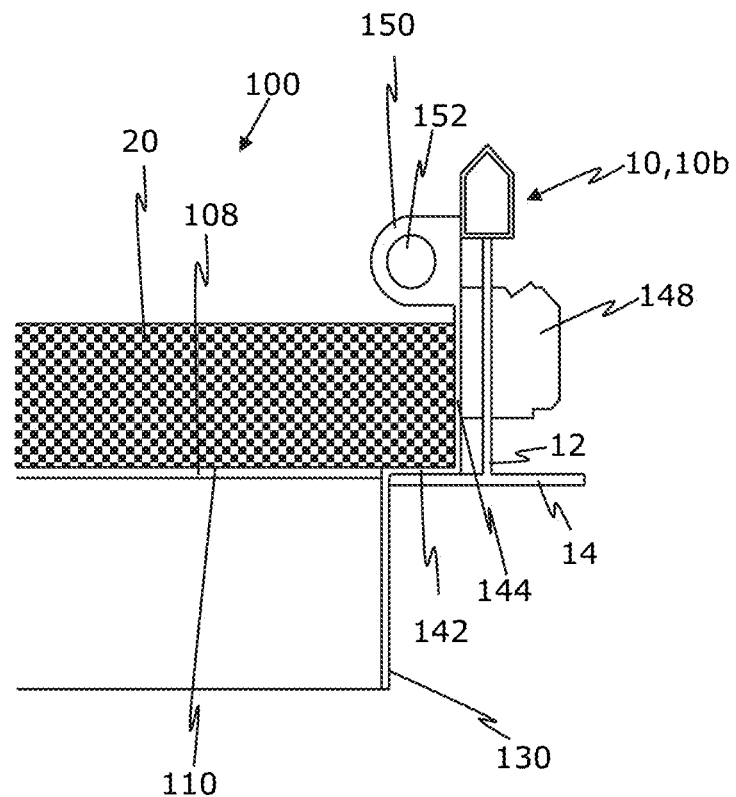
FIG. 8 is longitudinal cross-section view of the multifunctional ceiling support assembly of FIG. 6 with lay-in type ceiling tiles supported thereon, in accordance with an embodiment of the present disclosure.

As shown best from the views of FIGS. 3 and 8, the first and second clips 118, 120 on the base portion 108 and the second support portions 142 of the first and second connecting members 134a, 134b are configured to support the ceiling tiles 22 thereon.

Figure 9:
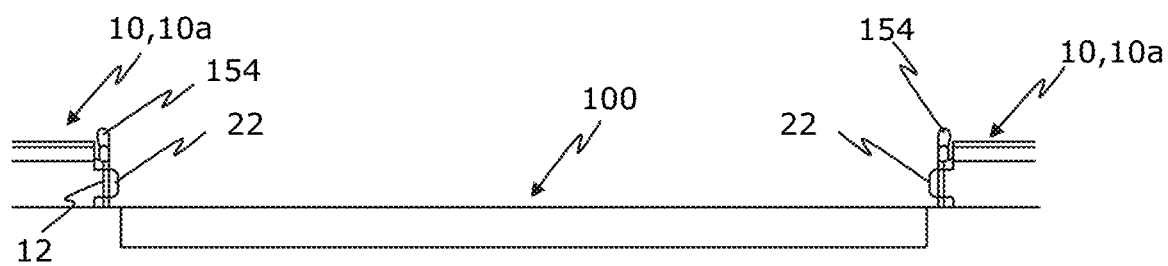
FIG. 9 is a longitudinal cross-section view of the multifunctional ceiling support assembly of FIG. 4, in accordance with an embodiment of the present disclosure.

Additionally, turning back to, and as shown best in, the view of FIG. 4, each of the third support portions of the first and second connecting members 134a, 134b further comprises a cut-out 156. The cut-outs 156 of the first and second connecting members 134a, 134b are configured to receive anchors 22 of the two T-bars 10a arranged longitudinal to the multifunctional ceiling support assembly 100, as also shown in the view of FIG. 9. Alternatively, as shown in the view of FIG. 5, the second support portion 142 may also be configured to extend orthogonally and centrally from both the first and third support portions 140, 142. In this alternative configuration, the first and third support portions 140, 142 would also be spaced apart and oriented orthogonally to each other. Further, the second support portion 142 defines a hole 158 for supporting the same, or another, suspension cable therethrough.

Further, as shown in FIGS. 2, 3 and 6, the multifunctional ceiling support assembly 100 may additionally include a third connecting member 160 that can be used, depending on the specific application, for any combination of 1) connecting the multifunctional ceiling support assembly with a T-bar, 2) serving as a suspension attachment location, and 3) serving a positioning bracket to hold a ceiling tile in place and prevent excessive lateral movement. The third connecting member 160 extends up from the elongate body 102 and functions to separate and position ceiling tiles 20 within the T-bar grid arrangement. The third connecting member 160 includes a first support portion 162 and a second support portion 164.

As shown in the views of FIGS. 3 and 6, the first support portion 162 is coupled to the top plane 110 of the base portion 108. Further, the second support portion 164 extends vertically from the first support portion 162. Moreover, the second support portion 164 defines a cut-out 166 for receiving the anchor 22 of a T-bar, for example, an intermediary T-bar (not shown) that may be arranged between the two laterally spaced apart T-bars 10b. Furthermore, the second support portion also defines one or more holes 168 for supporting a suspension cable therethrough. Additionally, the third connecting member 160 serves as a positioning spacer to hold a ceiling tile in place and prevents excessive movement in a direction transverse to the multifunctional ceiling support assembly.

By providing one or more holes 168 in the second support portion 164 of the third connecting member 160, the multifunctional ceiling support assembly 100 is rendered with improved versatility to accommodate for various spatial adjustments, for example, in cases where tolerances would have otherwise been needed to accommodate receipt of the suspension cable therethrough.

Accordingly, from the foregoing description, it is evident that the multifunctional ceiling support assembly 100 of the present disclosure serves to support and align one or more ceiling tiles 20 while connecting one or more T-bars in the grid. Typically, the ceiling tile 20 rest upon the top plane 110 of the elongate body 102. Further, the multifunctional ceiling support assembly 100 also provides a means of connecting the suspension cables or other similar, or dissimilar, suspension hardware thereto. In other words, each of the first, second and third connecting members 134a, 134b, 160 further comprises an anchoring hole, such as the holes 152, 168 that serves as an attachment point for suspension from a structural ceiling.

Figure 7A:
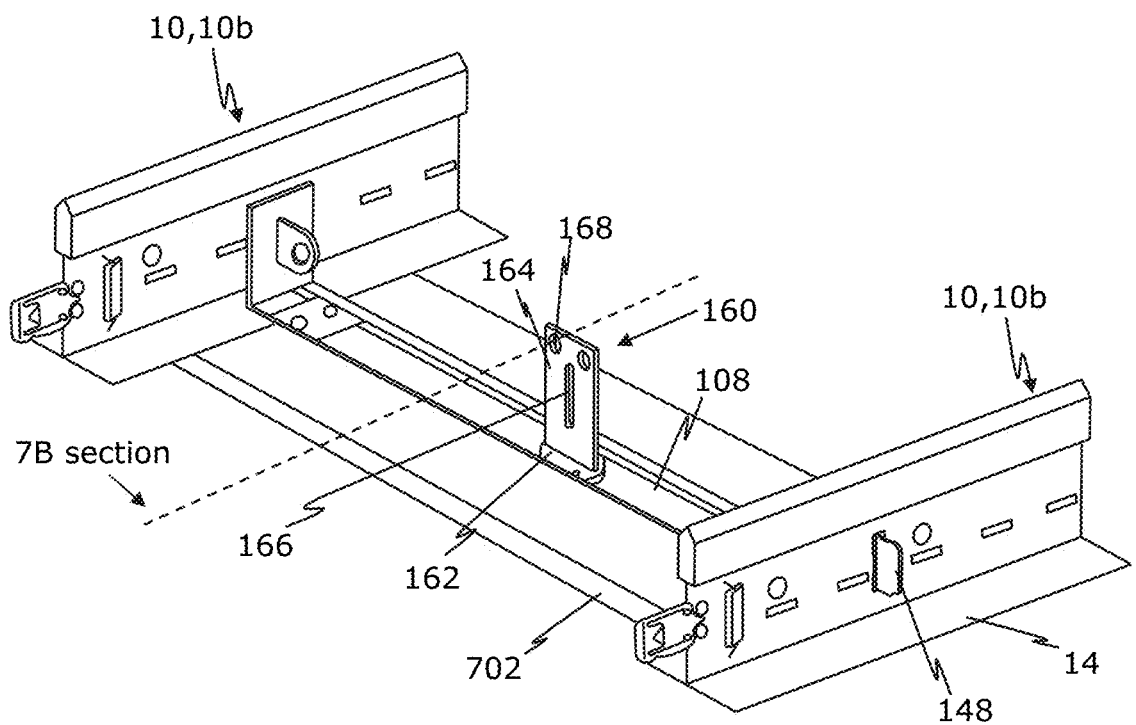
FIG. 7A is a top perspective view of a multifunctional ceiling support assembly having an edge lit light guide, in accordance with yet another embodiment of the present disclosure.
Figure 7B:
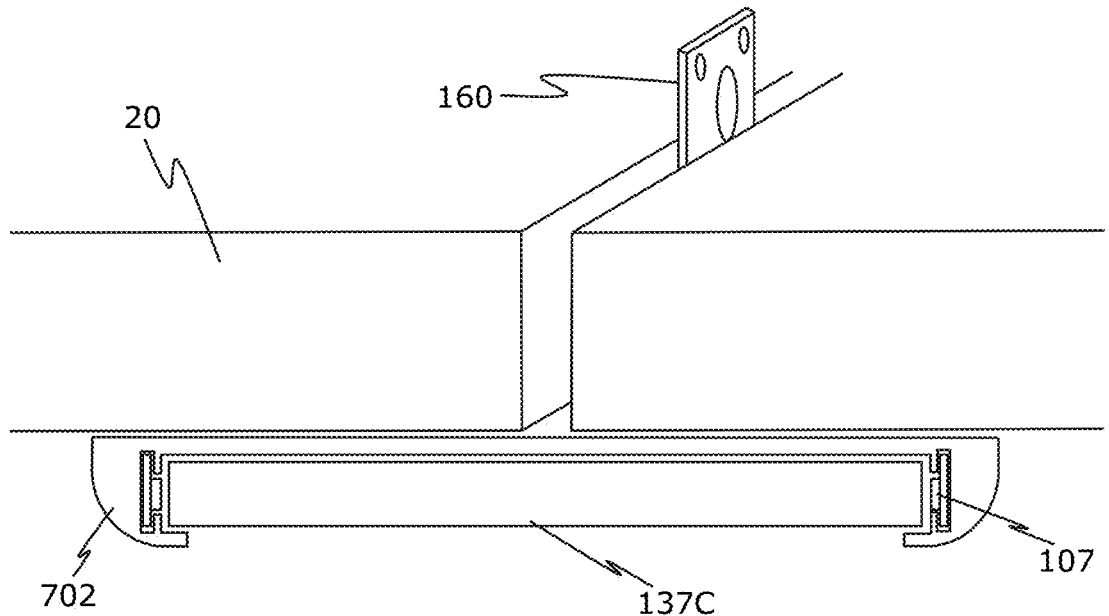
FIG. 7B is a transverse cross-section view of the multifunctional ceiling support the assembly of FIG. 7A with ceiling tiles resting thereon, in accordance with an embodiment of the present disclosure.

Referring now to FIG. 7A (top perspective view) and FIG. 7B (transverse cross-section view) are illustrations of a multifunctional ceiling support assembly embodiment comprising a double edge lit light guide 137C. The dotted line and "7B section" notation with arrow in FIG. 7A identify the cross-section orientation of the FIG. 7B view. The light guide 137C is mounted inside an elongate body 702. The elongate body 702 is wider than the T-bar horizontal leg 14 and mounted flush with the underside of the ceiling panel 20. This embodiment provides a unique form factor with aesthetic and functional advantages. The increased width allows for a wider light guide and therefore increased light emitting surface. This can be useful in reducing peak brightness and glare. The shallow height of the elongate body 702 minimizes protrusion into the illuminated space below. FIG. 7B shows Lay-In type ceiling tiles 20 being positioned in place by the third connecting member 160 which also serves as an available attachment point for suspension connection to the structural ceiling. LEDs 107, are typically arranged in linear arrays to input light into one or two edges of the light guide 137C.

FIG. 8 is longitudinal cross-section view of the multifunctional ceiling support assembly 100 of FIGS. 2, 3 and 6 mounted in a suspended ceiling system. The ceiling tile 20 is positioned in a Lay-In type configuration with a 90 degrees squared edge that positions the ceiling tile 20 directly upon the top plane 110 of the base portion 108 as well as on the second supporting section 142 and the third connecting member 160. The projecting tab 148 engages with the vertical portion 12 of the T-bar 10 to secure the position of the second supporting section 142 which rests upon the horizontal leg 14 of the T-bar 10. The support tab 150 includes the hole 152 which serves an attachment point for means of suspension such as for example, a suspension cable.

FIG. 9 is a longitudinal cross-section view of the multifunctional ceiling support assembly 100 embodiment of FIG. 4 wherein the hook portion 154 of the connecting member latches over the vertical portion of the T-bar 10. In other words, the multifunctional support assembly 100 is operable to connect two T-bars 10 within the suspended ceiling system.

Figure 10A:
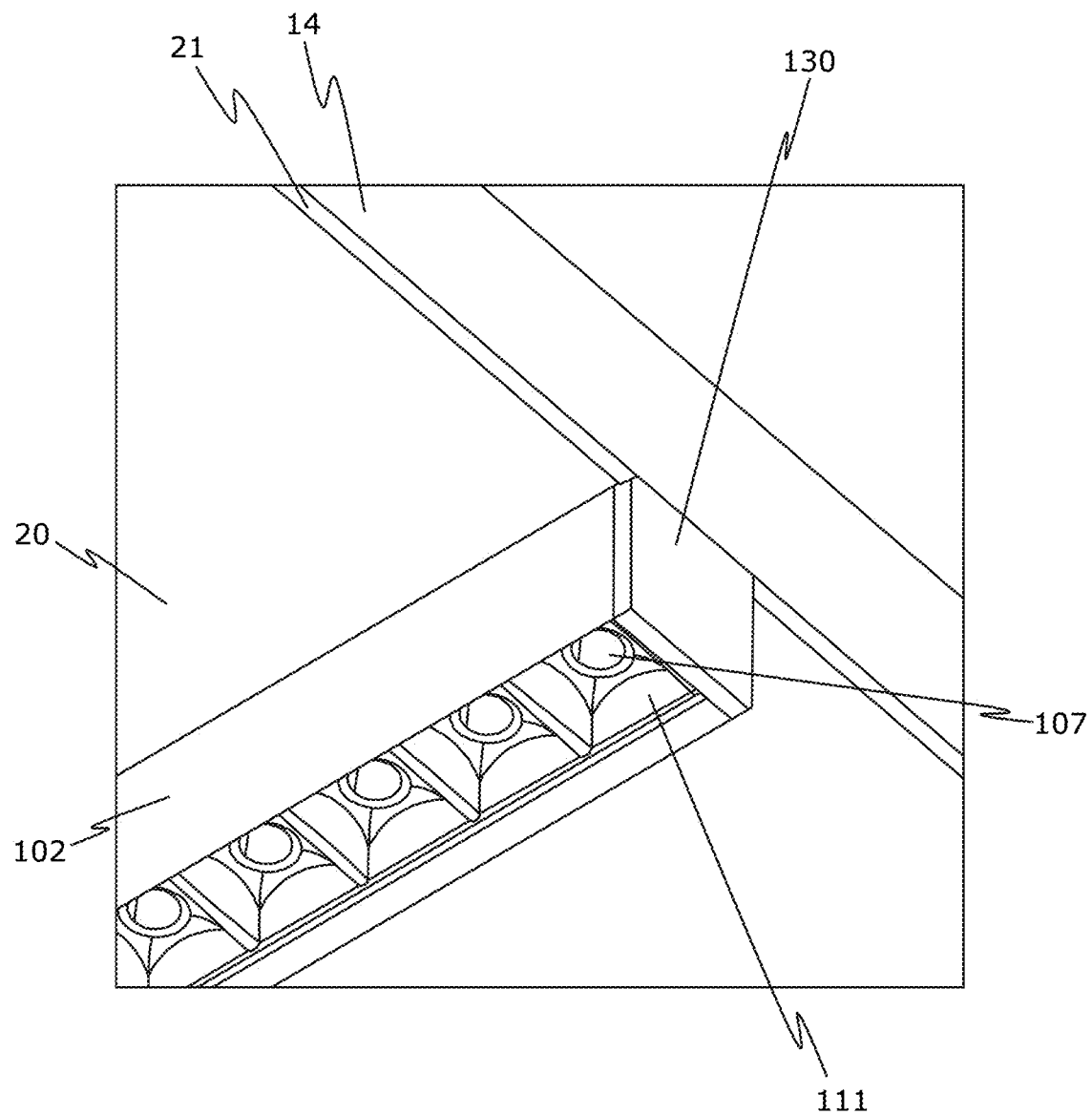
FIG. 10A is a bottom perspective view of a multifunctional ceiling support assembly wherein an elongate body houses an optical arrangement having collimating reflector lenses, in accordance with an embodiment of the present disclosure.

FIG. 10A is a bottom perspective view of a multifunctional ceiling support assembly embodiment of FIG. 2 installed in a suspended ceiling grid system. The ceiling tiles 20 are of tegular type with partially exposed edges 21 which extend below the T-bar horizontal leg 14. The elongate body 102 houses an optical arrangement comprising reflector lenses 111 which collimate light from LED 107 light sources. The end cap 130 serves as a first support section 140 of the connecting member which attaches to the T-bar grid.

Figure 10B:
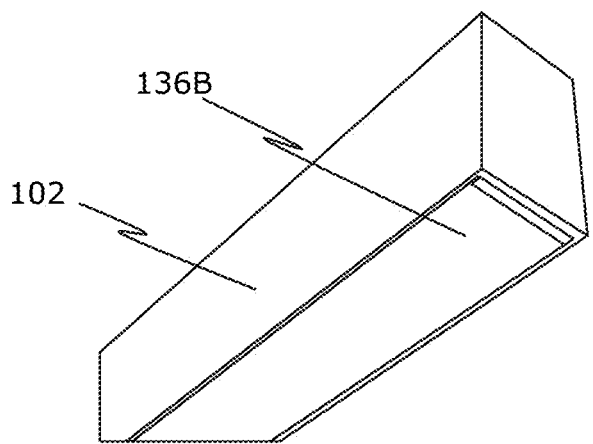
FIGS. 10B-10D are perspective bottom views of a multifunctional ceiling support assembly with differing optical arrangements housed within the elongate body, in accordance with various embodiments of the present disclosure.
Figure 10C:
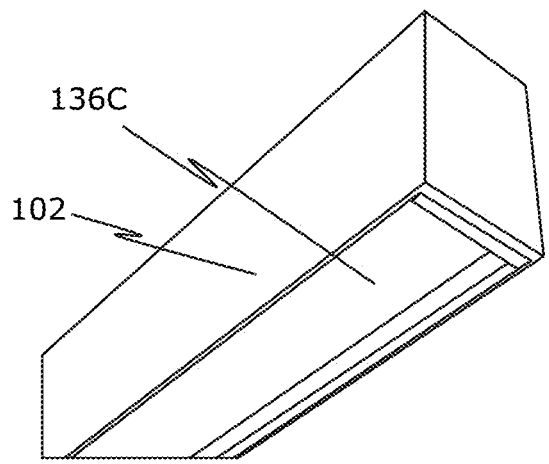
Figure 10D:
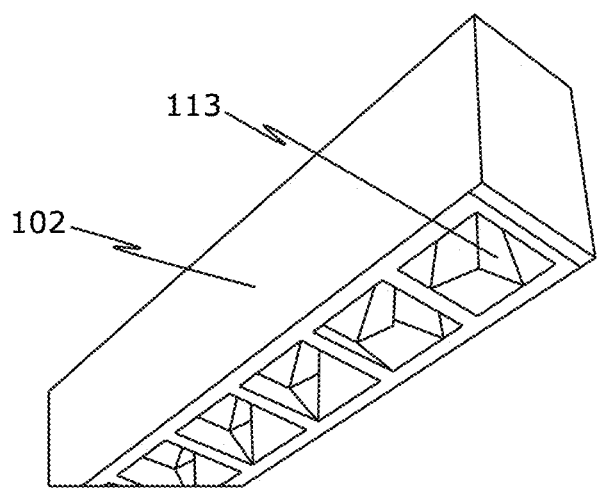

FIGS. 10B-10D are perspective bottom views of a multifunctional ceiling support assembly embodiments with differing optical arrangements housed within the elongate body 102. FIG. 10B is an embodiment wherein the optical element 136B is a translucent lens that is mounted flush with a bottom plane of the elongate body 102. FIG. 10C is an embodiment wherein the optical element 136C is a translucent lens that is mounted recessed within the elongate body 102. This can be advantageous is some applications where reducing glare is important. FIG. 10D is an embodiment which includes black baffling 113 around reflector optics as means for reducing glare.

Figure 11:
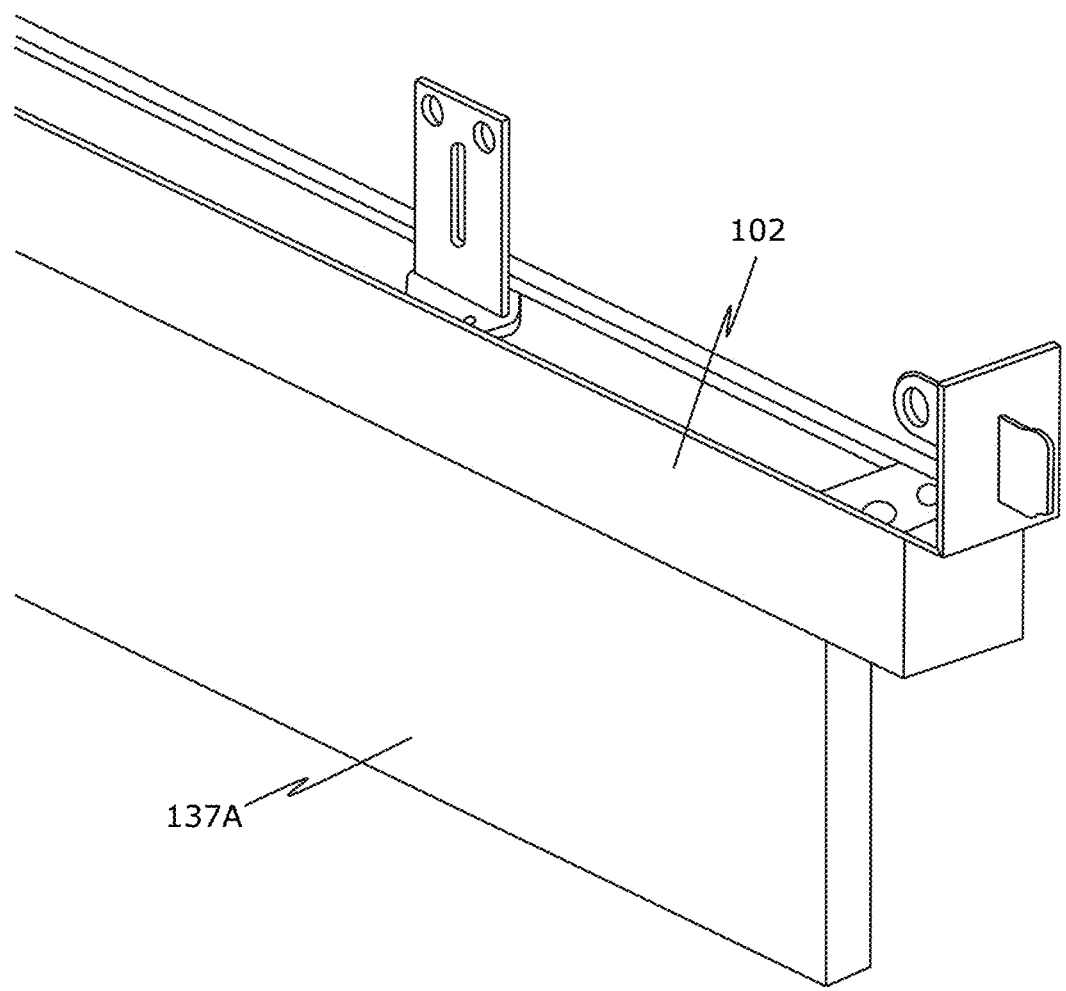
FIG. 11 is a top perspective view of a multifunctional ceiling support assembly having a downward projecting light guide that is mounted parallel with a longitudinal axis of the multifunctional ceiling support assembly, in accordance with an embodiment of the present disclosure.

FIG. 11 is a top perspective view of the multifunctional ceiling support assembly embodiment of FIG. 2 further comprising a light guide 137A that is mounted parallel with the longitudinal axis of the multifunctional ceiling support assembly and projects in a downward direction. Light is input into an input edge of the light guide 137A by LEDs within the light elongate body 102 and light is propagated downward by internal reflection. Means for extraction of light include surface features on the external surface of the light guide as well as light scattering materials within the volume of the light guide.

Figure 12:
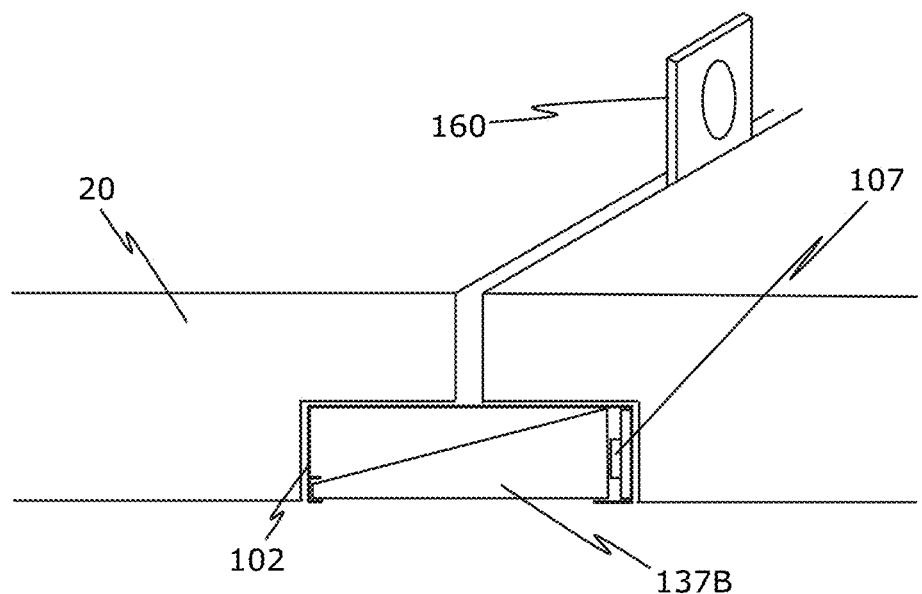
FIG. 12 is a top perspective transverse cross-section view of a multifunctional ceiling support assembly having a light guide within the elongate body that is parallel with the general ceiling plane and extending along the longitudinal axis of the multifunctional ceiling support assembly, in accordance with an embodiment of the present disclosure.

FIG. 12 is a top perspective transverse cross-section view of a multifunctional ceiling support assembly embodiment further comprising an edge lit light guide 137B within the elongate body that is parallel with the general ceiling plane and extending along the longitudinal axis of the multifunctional ceiling support assembly. The light guide 137A includes an input edge within the elongate body 102. The ceiling tiles 20 are of tegular type with kerfed edges that provide a cavity for the elongate body 102 to fit within and allow the option of mounting flush with the bottom of the ceiling tiles 20. The third connecting member 160 extends up between the ceiling panels to hold ceiling tiles in position and serve as an optional suspension anchor point. In this particular embodiment, LEDs 107 are mounted horizontally along a single edge which can be utilized to achieve asymmetric output. Also, as shown in FIG. 12, the elongate body 102 is at least partially recessed within tegular edges of two abutting ceiling tiles 20. Further, the light source (or edge lit light guide 137B) is also recessed within the tegular edges of two abutting ceiling tiles 20. As shown in FIG. 12, lower surfaces of the light guide 137A and the two abutting ceiling tiles 20 conform (i.e. on a same plane), however, in another embodiments the lower surface of the light guide 137A may rest inside a recess of the abutting ceiling tiles 20 or may project outside the recess of the abutting ceiling tiles 20. It will be evident that based on a height of the elongate body 102, the lower surface of the light guide 137A may rest inside or project outside the recess.

Figure 13:
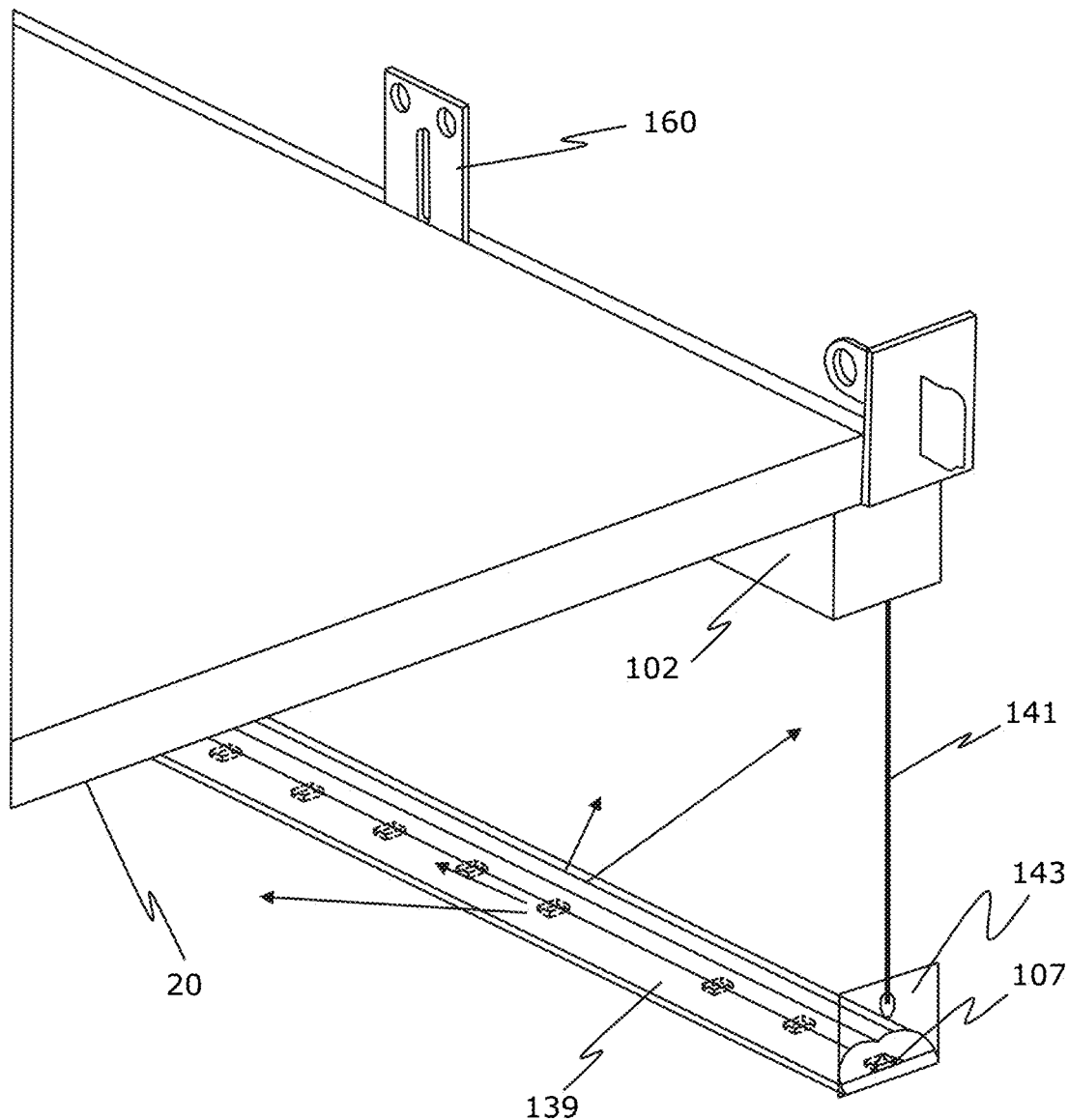
FIG. 13 is a top perspective view of a multifunctional ceiling support assembly having an upward projecting optical arrangement that is positioned below the elongate body and mounted parallel with the longitudinal axis of the multifunctional ceiling support assembly, in accordance with an embodiment of the present disclosure.

FIG. 13 is a top perspective view of a multifunctional ceiling support assembly embodiment further comprising an upward projecting optical arrangement that is positioned below the elongate body and mounted parallel with the longitudinal axis of the multifunctional ceiling support assembly. A lens 139 is positioned over a series of LEDs 107 and used to project light in an upward direction onto the bottom surface of ceiling tiles 20 from where it is subsequently reflected downward into an illuminated space below. In this indirect lighting configuration the lens 139 can be optimized to provide a uniform light pattern upon the bottom surface of the ceiling tiles 20 which are typically white and of high reflectance. A suspension cable 141, rod or bracket is used to position the lens 139 below the elongate body 102 and connects from the elongate body 102 to a lens connecting member 143 which supports the lens 139 and light source, LEDs 107. A third connecting member 160 extends up between ceiling panels to hold ceiling tiles 20 in position and serve as an optional suspension anchor point to the structural ceiling.

Figure 14A:
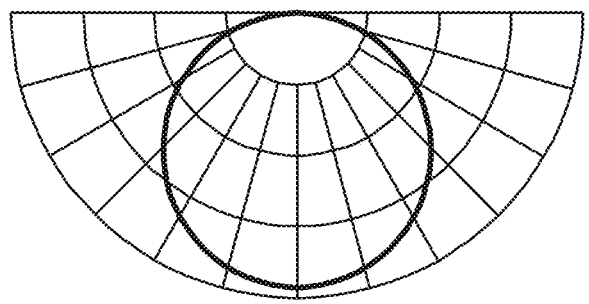
FIGS. 14A-14F show in polar plot form differing light distribution patterns that can be achieved with various embodiments of particular optical arrangement, in accordance with various embodiments of the present disclosure.
Figure 14B:
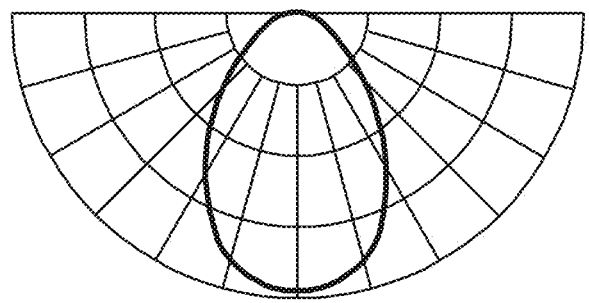
Figure 14C:
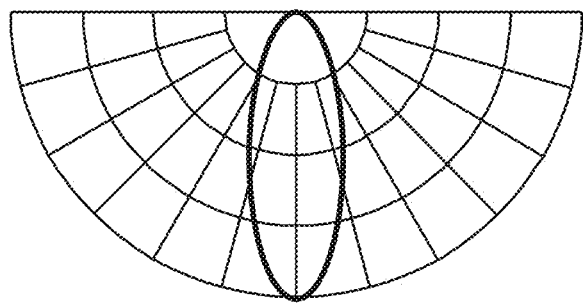
Figure 14D:
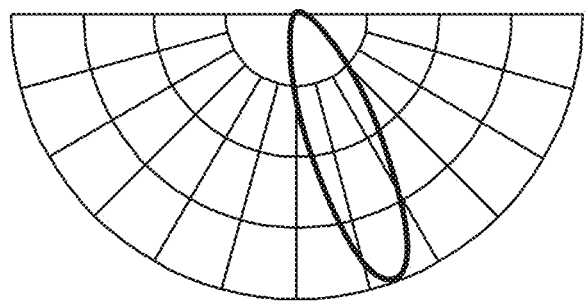
Figure 14E:
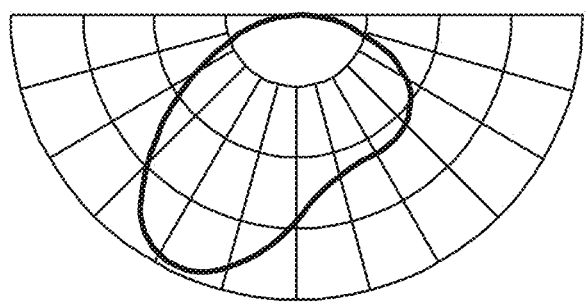
Figure 14F:
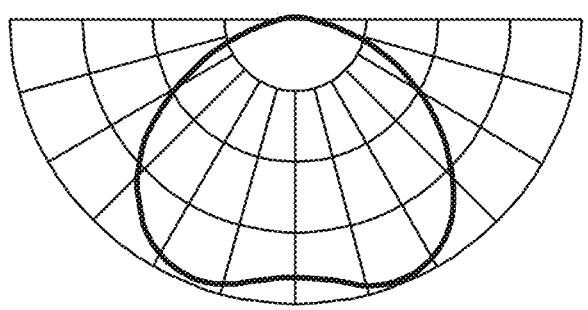

FIGS. 14A-14F show in polar plot form differing light distribution patterns that can be achieved with various embodiments of multifunctional ceiling support assembly embodiments having particular optical arrangements. All figures are polar plots of relative intensity vs. angle of light distribution. FIG. 14A shows a Lambertian distribution which can be achieved for example with a diffuse optical element implemented in the configuration of FIG. 3. FIG. 14B and FIG. 14C show medium and narrow collimated beams respectively. These can be achieved, for example, with optimization of reflectors shown in FIG. 3 and FIG. 10. FIG. 14D shows a narrow asymmetric light distribution which can be achieved, for example, by optimization of the reflector and optical element of FIG. 3. FIG. 14E shows a wall wash light distribution which can be achieved, for example, by optimization of the embodiment of FIG. 12. FIG. 14F shows a wide spread light distribution which can be achieve, for example, by optimization of the embodiment of FIG. 11. The specific light distributions and means for achieving them are representative but not comprehensive examples.

Figure 15A:
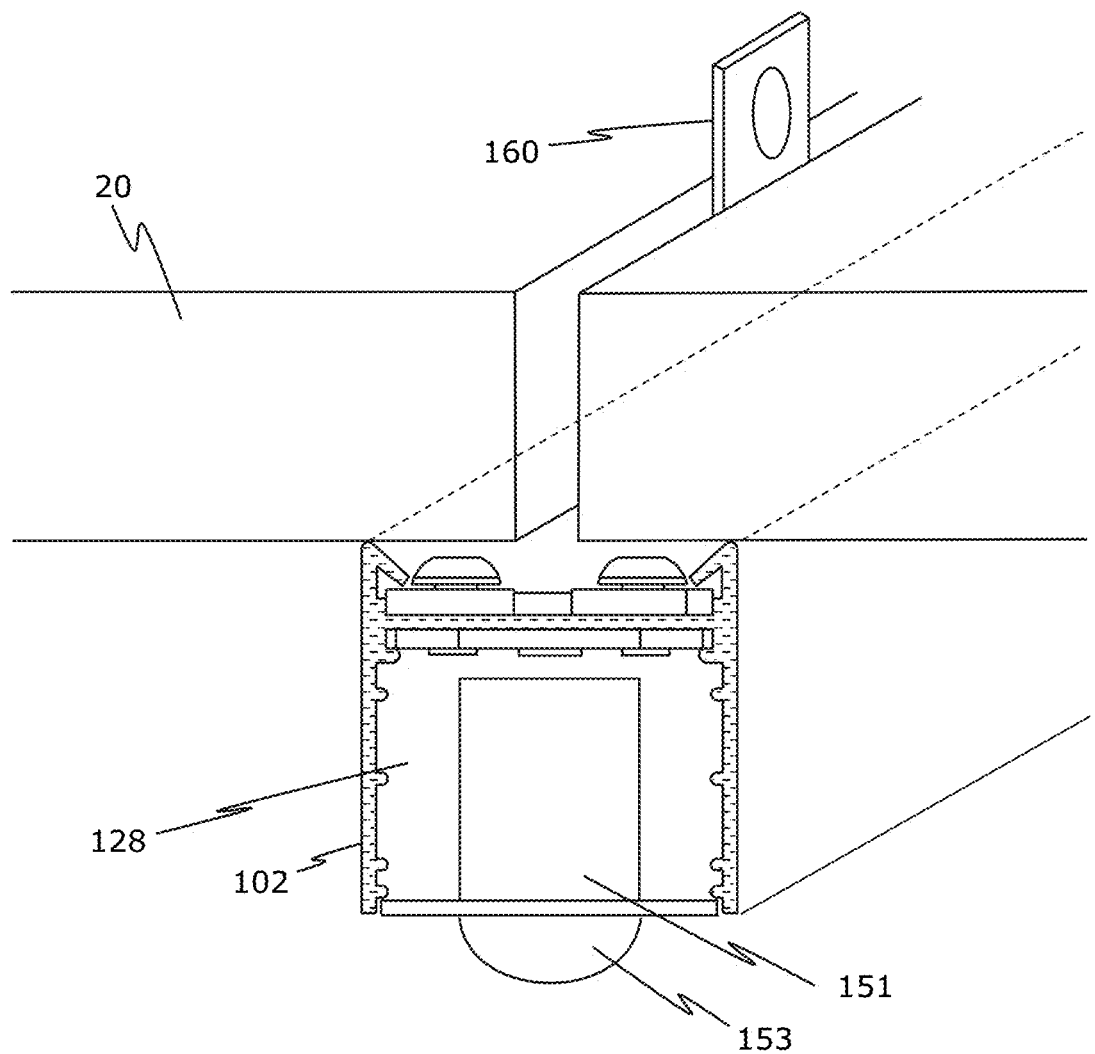
FIGS. 15A-15B show multifunctional ceiling support assembly embodiments with alternative arrangements of sensors and electronics housed within elongate bodies, in accordance with various embodiments of the present disclosure.

FIG. 15A is a top perspective view which shows a multifunctional ceiling support assembly embodiment with a sensor 151 housed within the void space 128 of the elongate body 102. A sensor head 153 extends below the elongate body 102 to receive stimulus from the environment, for example, ambient light level or motion detection. Additional electronics such as electronic controllers, wireless communication components, power supplies, and batteries may also be housed within the elongate body. Lay-In type ceiling tiles 20 are held in position by the third connecting member 160 which also serves as an optional attachment point for suspension from the structural ceiling.

Figure 15B:
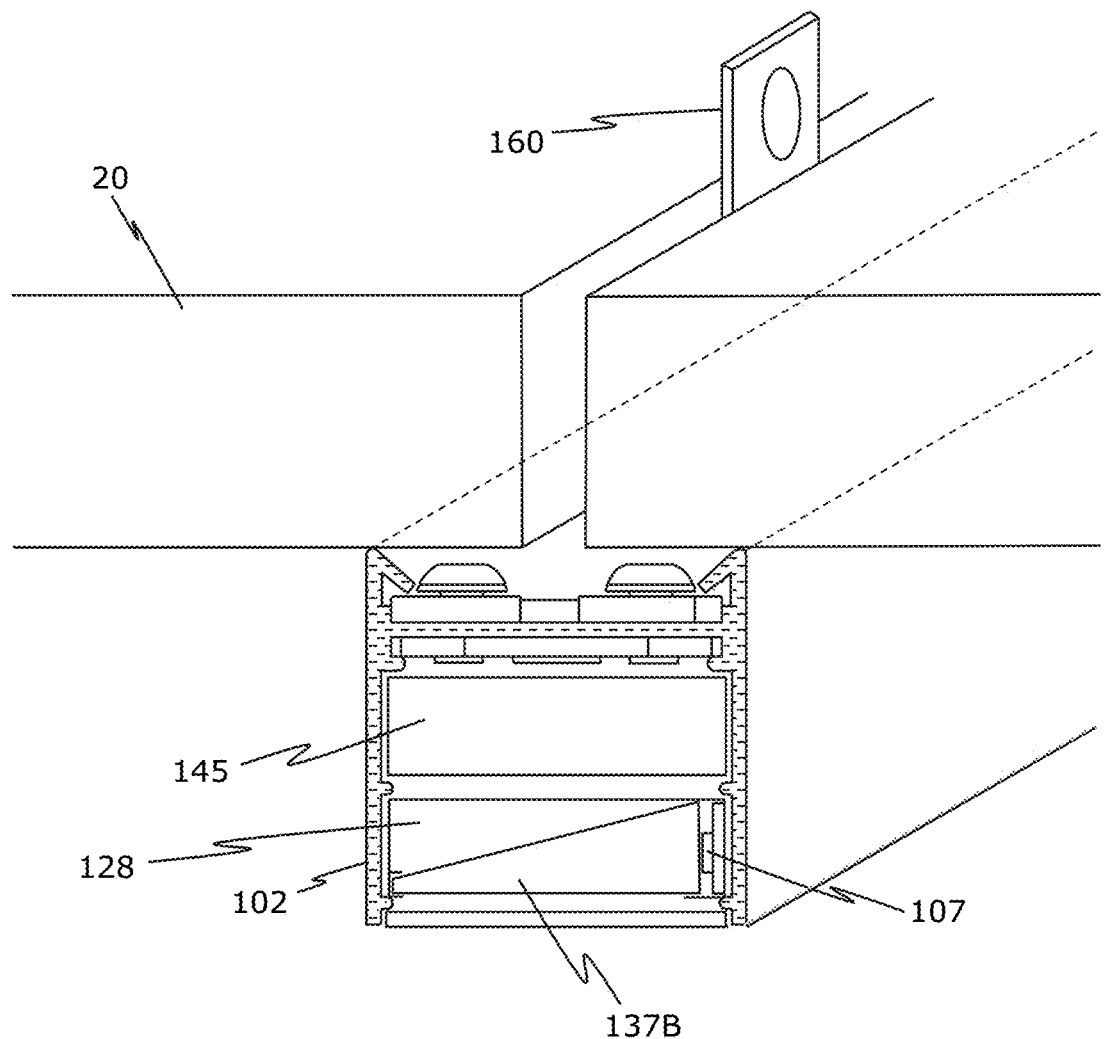

FIG. 15B is a top perspective view which shows a multifunctional ceiling support assembly embodiment which includes a power supply 143 and an edge lit light guide 137B housed within the void space 128 of the elongate body 102. Lay-In type ceiling tiles 20 are held in position by the third connecting member 160 which also serves as an optional attachment point for suspension from the structural ceiling.

Figure 16:
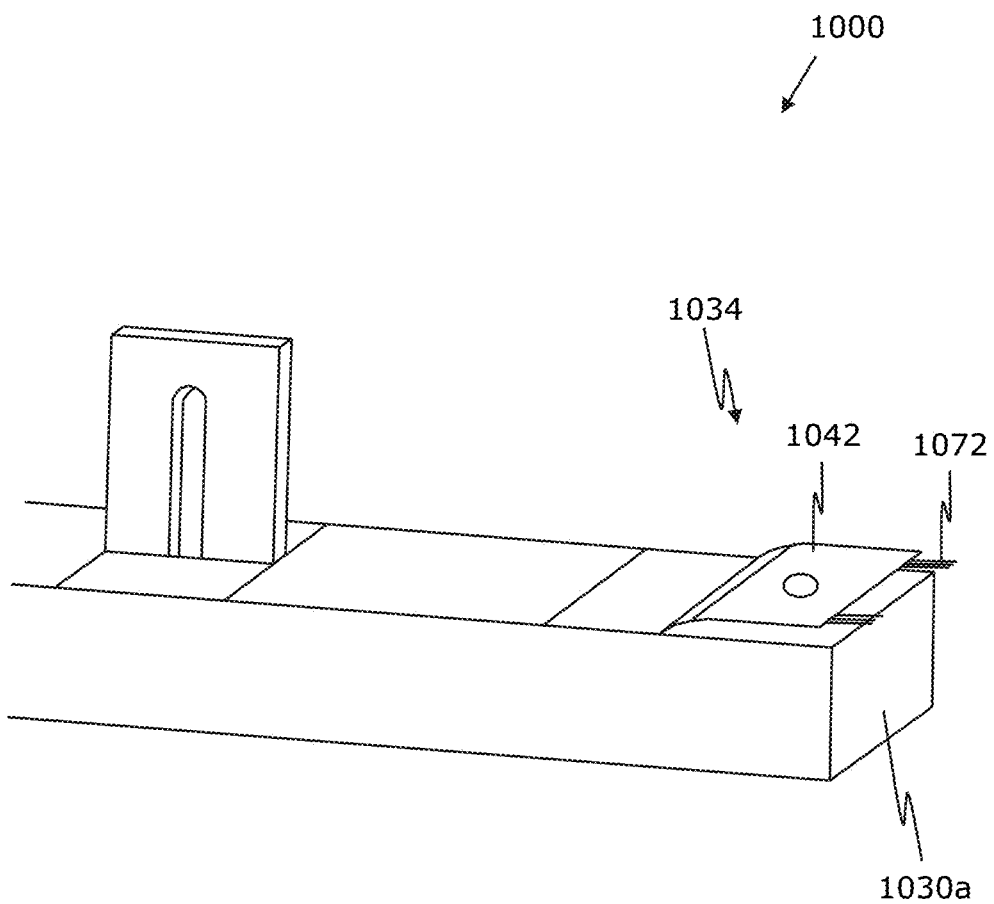
FIG. 16 is a perspective top view of a multifunctional ceiling support assembly showing an exemplary configuration of at least one of end caps for facilitating a wiring connection therethrough, in accordance with an embodiment of the present disclosure.

FIG. 16 illustrates a perspective top view of the multifunctional ceiling support assembly 1000 showing an exemplary configuration of at least one of the end caps, for instance, the end cap 1030a that facilitates a wiring connection 1072 therethrough. It is to be noted that the term 'wires' as disclosed herein is used to reference singular strands of wires, up to, multi-cored or multi-strand wires together with their respective insulation sheathings, or layers, as would be encountered in the case of flat profile cables.

Moreover, as shown in the view of FIG. 16, at least on one of the first and second connecting members (for instance, the first connecting member 1034a corresponding to the first longitudinal end 117), the first end cap 1030a may be configured to terminate partway, along a length of, the second support portion 1042 itself so as to form a ledge. In the view of FIG. 16, it may be noted that the second support portion does not extend into the third support portion, for example, the third support portion 144 that is instead shown in the views of FIGS. 2, 4-6 and 8-9 respectively.

Figure 17A:
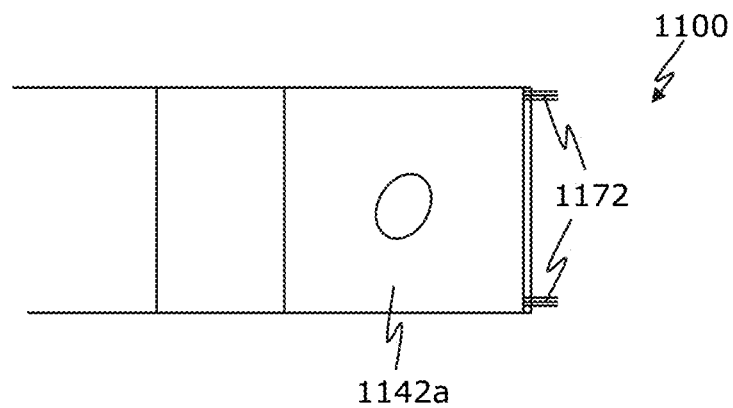
FIGS. 17A-17G are schematic top view of multifunctional ceiling support assembly showing other exemplary configurations of end caps for facilitating the wiring connection therethrough, in accordance with various embodiments of the present disclosure.

FIGS. 17A-17G are schematic top view of the multifunctional ceiling support assembly 1100, 1102, 1104, 1106, 1108, 1110, 1112 showing other exemplary configurations of end caps for facilitating the wires 1172 therethrough. Also, as shown by way of FIGS. 17A through 17G, the elongated body 1102 may have different configurations of the second support portions 1142a through 1142g that can be contemplated, in lieu of that disclosed in conjunction with FIG. 16. Also, from the views of FIGS. 17A to 17G, it is also evident that a shape of the second support portion 1142 is changed to suit specific requirements dictated by a specific type of suspended ceiling grid application, for example, when the second support portions 1142 are adapted to meet with a specific size, shape, and/or configuration of the T-bars 10 that are being used in forming the suspended ceiling grid. In an example as shown in the view of FIG. 17A, the second support portion 1142a is of a quadrilateral configuration.

Figure 17B:
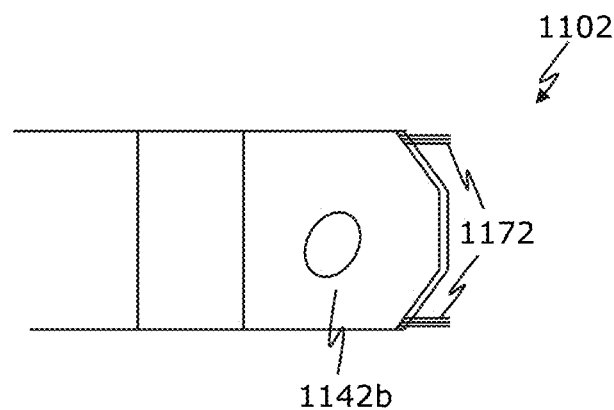
Figure 17C:
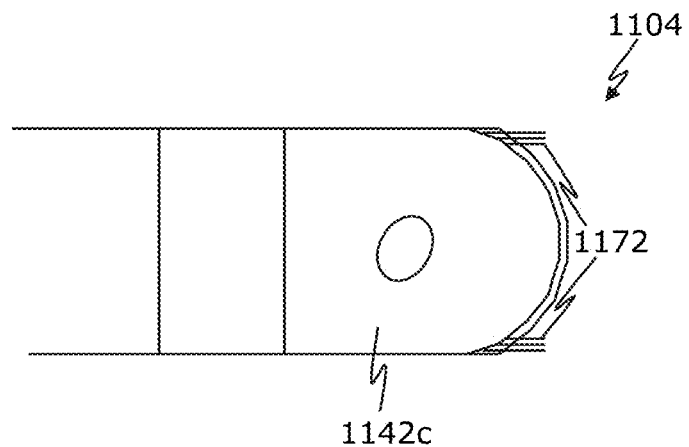
Figure 17D:
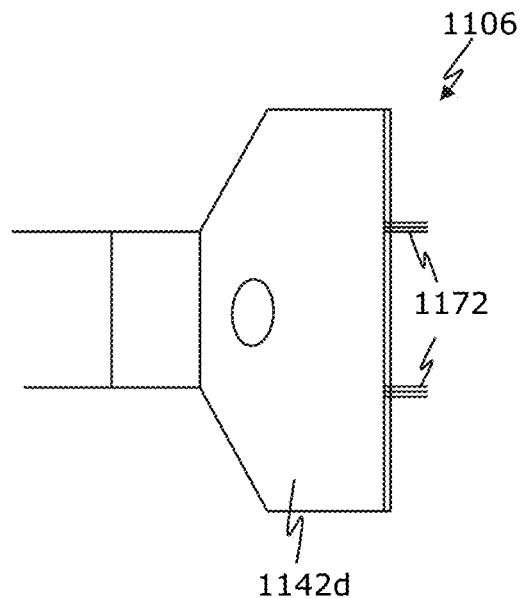
Figure 17E:
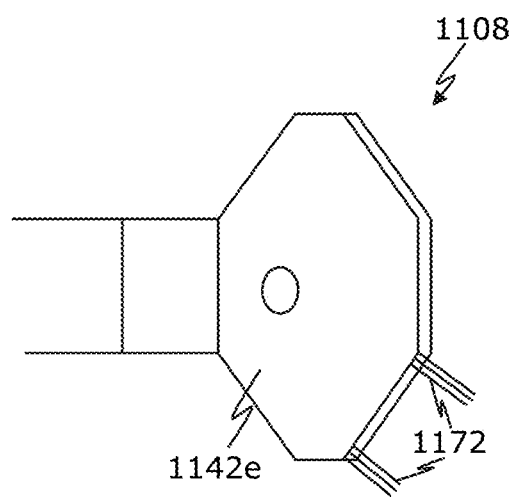
Figure 17F:
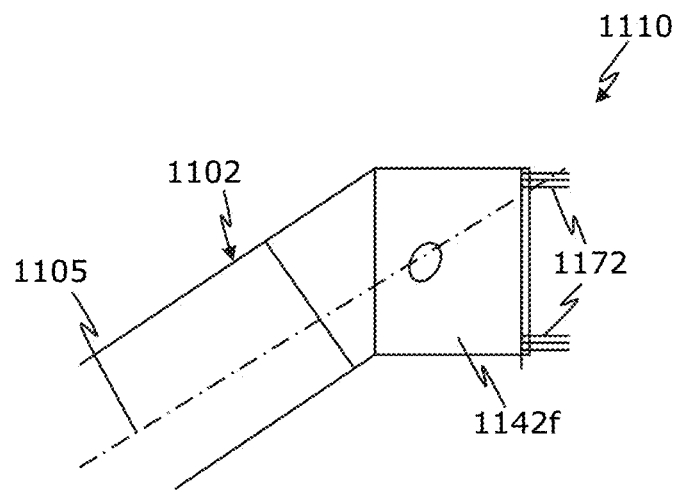
Figure 17G:
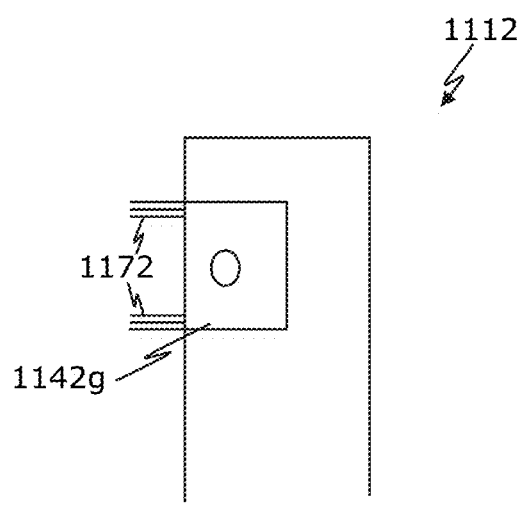

In another example as shown in the view of FIG. 17B, the second support portion 1142b is of a semi-hexagonal configuration. In yet another example as shown in the view of FIG. 17C, the second support portion 1142c is of a semi-circular configuration. In yet another example as shown in the view of FIG. 17D, the second support portion 1142d is of a broadened-butt configuration. In yet another example as shown in the view of FIG. 17E, the second support portion 1142e is of an equiaxed, or hexangular, configuration. In yet another example, as shown in the view of FIG. 17F, the second support portion 1142f may be angled to a general mid-plane 1105 of the elongated body 1102. In yet another example as shown in the view of FIG. 17G, the second support portion 1142g is substantially co-planar yet oriented perpendicularly to the elongate body 1102.

Figure 18:
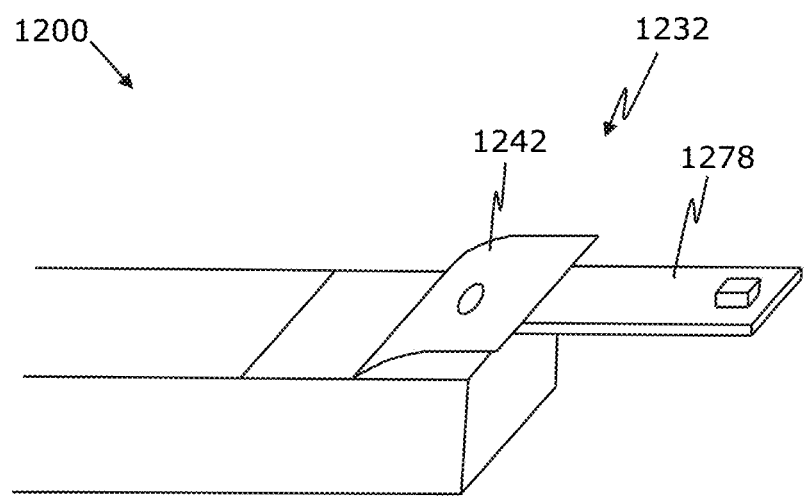
FIG. 18 is a perspective top view of the multifunctional ceiling support assembly from FIG. 16 used with a flexible PCB, in accordance with an embodiment of the present disclosure.

Although a specific wiring type has been disclosed earlier herein, such type is merely illustrative and hence, non-limiting of this disclosure. As shown best in the view of FIG. 18, a multifunctional ceiling support assembly 1200 may be configured to include a connecting member 1232 having a second support portion 1242 that allows for a flexible PCB strip 1278 to be received therethrough. In fact, it is envisioned that such flexible PCB strip 1278 may be easier to route while also effectively catering to power distribution requirements and/or control requirements of elongated light assemblies (not shown) when multiple such ceiling support assemblies 1200 are for instance, daisy-chained or grouped together in another manner, or configuration commonly known in the art. In addition, the flexible PCB is thinner and therefore, also easier to route under a ceiling tile without significantly raising the ceiling tile above the T-Bar element, if any. By way of embodiments herein, it is hereby envisioned that the ceiling support assemblies of the present disclosure can serve to not only structurally form, in part, the ceiling grid of the suspended ceiling arrangement but also function as part of an electrical circuit.

Figure 19:
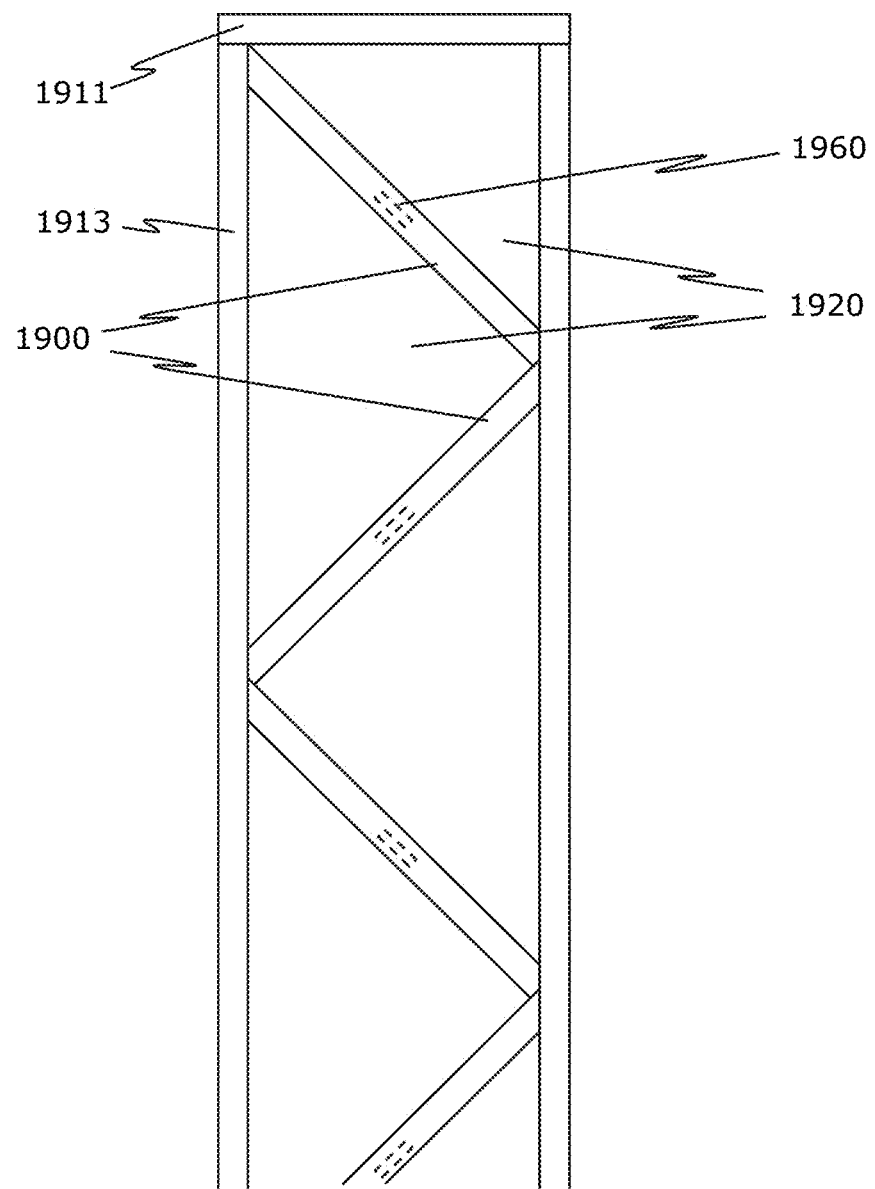
FIG. 19 is a bottom view of a suspended ceiling grid system layout wherein multifunctional ceiling support assemblies are mounted non-parallel to the ceiling grid T-bars, in accordance with an embodiment of the present disclosure.

FIG. 19 is a bottom view of an embodiment suspended ceiling grid system layout wherein multifunctional ceiling support assemblies 1900 are mounted non-parallel to ceiling grid T-bars 1911 and 1913 which define x and y axes of the ceiling grid system respectively. In this embodiment, the ceiling tiles 1920 are cut to custom triangular shapes. Third connecting members 1960 (hidden from direct view and notated with dotted lines) extend up from the multifunctional ceiling support assemblies 1900 in a positive z direction and function to serve as spacer components that in combination with T-bars hold the ceiling tiles 1920 in position.

Modifications to embodiments of the present disclosure described in the foregoing are possible without departing from the scope of the present disclosure as defined by the accompanying claims. Expressions such as "including", "comprising", "incorporating", have", "is" used to describe and claim the present disclosure are intended to be construed in a non-exclusive manner, namely allowing for items, components or elements not explicitly described also to be present. Reference to the singular is also to be construed to relate to the plural.

We claim:

1. A multifunctional lighting assembly configured as a cross-tee for use in a T-bar grid arrangement, the multifunctional lighting assembly comprising:
   a) an elongate body comprising an elongate planar base portion having first and second lateral ends, first and second longitudinal ends, a top plane, and a channel located in an interior space of the elongate planar base portion bounded by first and second protrusions of the elongate body;
   b) an elongate light assembly positioned within the interior space of the elongate body comprising:
      i. a printed circuit board with one or more light emitting diodes arranged on the printed circuit board;
      ii. at least one optical component mounted between the first and second protrusions of the elongate body; and
   c) first and second connecting members each positioned at the first and second longitudinal ends of the elongate body having support portions configured to be attached to the T-bar grid arrangement.

2. The multifunctional lighting assembly of claim 1 wherein a respective said first or second connecting member further comprises an anchoring hole that serves as an attachment point for suspension from a structural ceiling.

3. The multifunctional lighting assembly of claim 1, wherein a width of the elongate body is less than or equal to a width of a respective T-bar within the T-bar grid arrangement.

4. The multifunctional lighting assembly of claim 1 wherein at least one optical component is chosen from a group consisting of reflector, lens, optical element, light guide, and diffuser.

5. The multifunctional lighting assembly of claim 1 wherein an optical element redirects light emitted from a reflector or light guide.

6. The multifunctional lighting assembly of claim 1 which produces a light distribution from at least one of a group consisting of wide, narrow, symmetric, and asymmetric.

7. The multifunctional lighting assembly of claim 1 wherein the first or second connecting member is further comprised of a second support portion having a geometric configuration consisting of one of quadrilateral, semi-hexagonal, semi-circular, equiaxed, and hexangular.

8. The multifunctional lighting assembly of claim 1 wherein at least one of a group consisting of optical element, reflector, and printed circuit board is slidably mounted between the first and second protrusions of the elongate body.

9. The multifunctional lighting assembly of claim 1 further comprising projecting lips for mounting of at least one of a group consisting of optical element, reflector, light guide, lens diffuser, sensor, and printed circuit board.

10. The multifunctional lighting assembly of claim 1 wherein the printed circuit board is mounted to the base portion of the elongate body.

11. The multifunctional lighting assembly of claim 1 further comprising an end cap positioned at the first or second longitudinal end of the elongate body.

12. The multifunctional lighting assembly of claim 11 further comprising wiring routed through the end cap.

13. The multifunctional lighting assembly of claim 1 further comprising a component selected from a group consisting of light source, light emitting diode, alarm, sensor, audio sensor, acoustic sensor, motion sensor, position sensor, proximity sensor, light sensor, ultrasonic sensor, accelerometer, ventilation fan, heater, humidifier, electronic controller, power supply, battery, and wireless communication module.

14. The multifunctional lighting assembly of claim 13 in which a sensor arrangement is configured for switching the elongate light assembly on and off.

15. The multifunctional lighting assembly of claim 1 further comprising a third connecting member mounted on the top plane of the elongate body and extending up from the elongate body.

16. The multifunctional lighting assembly of claim 15 wherein the third connecting member comprises a first support portion coupled to the top plane of the elongate planar base portion and a second portion support portion extending vertically from the first support portion.

17. The multifunctional lighting assembly of claim 15 wherein a respective said first, second, or third connecting member further comprises an anchoring hole that serves as an attachment point for suspension from a structural ceiling.

18. The multifunctional lighting assembly of claim 1 wherein the T-bar grid arrangement is part of a suspended ceiling system comprising multiple ceiling panels.

19. The multifunctional lighting assembly of claim 18 which supports at least one ceiling panel.

20. The multifunctional lighting assembly of claim 18 configured to separate and position one or more of the multiple ceiling panels within the T-bar grid arrangement.

21. The multifunctional lighting assembly of claim 18 further comprising a third connecting member mounted on the top plane of the elongate body and extending up from the elongate body.

22. The multifunctional lighting assembly of claim 18 wherein one or more of the multiple ceiling panels rests upon the top plane of the elongate body.

23. The multifunctional lighting assembly of claim 18, wherein the elongate body is at least partially recessed within tegular edges of two abutting ceiling panels of the multiple ceiling panels.

24. The multifunctional lighting assembly of claim 18 wherein the elongate body is positioned below a bottom surface of at least one of the multiple ceiling panels of the suspended ceiling system.

* * * * *